US012293712B2

(12) United States Patent
Huang et al.

(10) Patent No.: US 12,293,712 B2
(45) Date of Patent: May 6, 2025

(54) PIXEL CIRCUIT AND DRIVING METHOD THEREOF, DISPLAY PANEL, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yao Huang, Beijing (CN); Cong Liu, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,913

(22) PCT Filed: Apr. 22, 2022

(86) PCT No.: PCT/CN2022/088377
§ 371 (c)(1),
(2) Date: Mar. 17, 2023

(87) PCT Pub. No.: WO2023/201678
PCT Pub. Date: Oct. 26, 2023

(65) Prior Publication Data
US 2024/0304141 A1 Sep. 12, 2024

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01);
(Continued)

(58) Field of Classification Search
CPC .. G09G 3/3233; G09G 3/3266; G09G 3/3291; G09G 2300/0842; G09G 2310/061; G09G 2310/08; G09G 2320/0233
See application file for complete search history.

(56) References Cited

U.S. PATENT DOCUMENTS 8,514,155 B2 8/2013 Kobayashi et al.
8,963,907 B2 2/2015 Tsai et al.
(Continued)

FOREIGN PATENT DOCUMENTS

CN 102436793 A 5/2012
CN 104680982 A 6/2015
(Continued)

OTHER PUBLICATIONS

Huang-Fu Lu-jiang, et al., LTPS-TFT Threshold Voltage Compensation Pixel Circuit for AMOLED Chinese Journal of Liquid Crystals and Displays, vol. 32 No. 8, Aug. 2017 (8 pgs).

*Primary Examiner* — Sahlu Okebato
(74) *Attorney, Agent, or Firm* — Banner & Witcoff, Ltd.

(57) ABSTRACT

A pixel circuit and a driving method thereof, a display panel, and display device are disclosed. The pixel circuit includes a data writing circuit, a driving circuit, and a compensation circuit. The compensation circuit is connected to a control terminal, a first terminal, and a second terminal of the driving circuit, and is configured to write a compensation voltage based on a first reset voltage into the control terminal of the driving circuit; the data writing circuit is connected to the control terminal of the driving circuit and is configured to write a coupling voltage based on a data voltage into the control terminal of the driving circuit; and the driving circuit is configured to control a driving current for driving a light-emitting element to emit light under control of a voltage applied to the control terminal of the driving circuit.

19 Claims, 8 Drawing Sheets

(52) U.S. Cl.
CPC ............... *G09G 2300/0842* (2013.01); *G09G 2310/061* (2013.01); *G09G 2310/08* (2013.01); *G09G 2320/0233* (2013.01)

(56) References Cited

U.S. PATENT DOCUMENTS

| | | | | |
|---|---|---|---|---|
| 10,535,299 | B2 | 1/2020 | Ling et al. | |
| 10,902,785 | B2 | 1/2021 | Wang | |
| 11,107,412 | B2 | 8/2021 | Chen et al. | |
| 2011/0199357 | A1 | 8/2011 | Chung et al. | |
| 2014/0333214 | A1 | 11/2014 | Okuno et al. | |
| 2017/0294163 | A1 | 10/2017 | Wu et al. | |
| 2019/0005877 | A1* | 1/2019 | Dong | G09G 3/3266 |
| 2019/0304371 | A1* | 10/2019 | Li | G09G 3/3258 |
| 2020/0135112 | A1* | 4/2020 | Zhang | G09G 3/3233 |
| 2020/0410937 | A1* | 12/2020 | Chen | G09G 3/3233 |

FOREIGN PATENT DOCUMENTS

| | | | |
|---|---|---|---|
| CN | 108648696 | A | 10/2018 |
| CN | 110288948 | A | 9/2019 |
| CN | 110379369 | A | 10/2019 |
| CN | 111583870 | A | 8/2020 |
| CN | 111613180 | A | 9/2020 |
| CN | 113053314 | A | 6/2021 |
| CN | 113160754 | A | 7/2021 |
| CN | 113436581 | A | 9/2021 |
| CN | 113593473 | A | 11/2021 |
| CN | 113593475 | A | 11/2021 |
| CN | 114038413 | A | 2/2022 |
| IN | 110197644 | A | 9/2019 |
| JP | 2003255856 | A | 9/2003 |

* cited by examiner

PIXEL CIRCUIT AND DRIVING METHOD THEREOF, DISPLAY PANEL, AND DISPLAY DEVICE

The application is a U.S. National Phase Entry of International Application No. PCT/CN2022/088377 filed on Apr. 22, 2022, designating the United States of America. The present application claims priority to and the benefit of the above-identified application and the above-identified application is incorporated by reference herein in its entirety.

TECHNICAL FIELD

The embodiments of the present disclosure relate to a pixel circuit and a driving method thereof, a display panel, and a display device.

BACKGROUND

An Organic Light-emitting Diode (OLED) display panel has the characteristics of self-luminescence, high contrast, low energy consumption, wide viewing angle, fast response, being applicable to flexible panels, wide temperature range, simple manufacture, and so on, and has broad development prospects. As a new display mode, OLED display panel can be widely used in mobile phones, monitors, notebook computers, digital cameras, instruments, and other devices with a display function.

SUMMARY

At least one embodiment of the present disclosure provides a pixel circuit, comprising: a data writing circuit, a driving circuit, and a compensation circuit. The driving circuit comprises a control terminal, a first terminal, and a second terminal, the compensation circuit is connected to the control terminal, the first terminal, and the second terminal of the driving circuit, and is configured to write a compensation voltage based on a first reset voltage into the control terminal of the driving circuit under control of a compensation control signal; the data writing circuit is connected to the control terminal of the driving circuit and is configured to write a coupling voltage based on a data voltage into the control terminal of the driving circuit under control of a scanning signal; and the driving circuit is configured to control a driving current for driving a light-emitting element to emit light under control of a voltage applied to the control terminal of the driving circuit.

For example, in the pixel circuit provided by at least one embodiment of the present disclosure, the data writing circuit comprises a first data writing sub-circuit and a second data writing sub-circuit, and the scanning signal comprises a first scanning sub-signal and a second scanning sub-signal, the first data writing sub-circuit is connected to a data writing node and is configured to write the data voltage into the data writing node under control of the first scanning sub-signal; and the second data writing sub-circuit is connected to the data writing node and the control terminal of the driving circuit, and is configured to write the coupling voltage based on a voltage of the data writing node into the control terminal of the driving circuit under control of the second scanning sub-signal.

For example, in the pixel circuit provided by at least one embodiment of the present disclosure, the first data writing sub-circuit comprises a first data writing transistor, and the second data writing sub-circuit comprises a second data writing transistor and a first capacitor, a first electrode of the first data writing transistor is configured to receive the data voltage, a second electrode of the first data writing transistor is connected to the data writing node, and a gate electrode of the first data writing transistor is configured to receive the first scanning sub-signal, a first electrode of the first capacitor is connected to the data writing node, and a second electrode of the first capacitor is connected to a first electrode of the second data writing transistor, a second electrode of the second data writing transistor is connected to the control terminal of the driving circuit, and a gate electrode of the second data writing transistor is configured to receive the second scanning sub-signal.

For example, the pixel circuit provided by at least one embodiment of the present disclosure further comprises a first reset circuit, the first reset circuit is connected to the data writing node and is configured to write a second reset voltage to the data writing node to reset the data writing node under control of a first reset control signal.

For example, in the pixel circuit provided by at least one embodiment of the present disclosure, the first reset circuit comprises a first reset transistor, a first electrode of the first reset transistor is configured to receive the second reset voltage, a second electrode of the first reset transistor is connected to the data writing node, and a gate electrode of the first reset transistor is configured to receive the first reset control signal.

For example, in the pixel circuit provided by at least one embodiment of the present disclosure, the compensation circuit comprises a first compensation sub-circuit and a second compensation sub-circuit, and the compensation control signal comprises a first compensation control sub-signal and a second compensation control sub-signal, the first compensation sub-circuit is connected to the second terminal of the driving circuit and is configured to write the first reset voltage into the second terminal of the driving circuit under control of the first compensation control sub-signal, and the second compensation sub-circuit is connected to the first terminal of the driving circuit and the control terminal of the driving circuit, and is configured to write the compensation voltage into the control terminal of the driving circuit under control of the second compensation control sub-signal.

For example, in the pixel circuit provided by at least one embodiment of the present disclosure, the first compensation sub-circuit comprises a first compensation transistor and the second compensation sub-circuit comprises a second compensation transistor, a first electrode of the first compensation transistor is configured to receive the first reset voltage, a second electrode of the first compensation transistor is connected to the second terminal of the driving circuit, and a gate electrode of the first compensation transistor is configured to receive the first compensation control sub-signal; a first electrode of the second compensation transistor is connected to the first terminal of the driving circuit, a second electrode of the second compensation transistor is connected to the control terminal of the driving circuit, and a gate electrode of the second compensation transistor is configured to receive the second compensation control sub-signal.

For example, the pixel circuit provided by at least one embodiment of the present disclosure further comprises a storage circuit, the storage circuit is connected to the control terminal of the driving circuit and a first terminal of the light-emitting element, and is configured to store a voltage of the control terminal of the driving circuit.

For example, in the pixel circuit provided by at least one embodiment of the present disclosure, the storage circuit comprises a second capacitor, a first electrode of the second capacitor is connected to the control terminal of the driving circuit, and a second electrode of the second capacitor is connected to the first terminal of the light-emitting element.

For example, the pixel circuit provided by at least one embodiment of the present disclosure further comprises an isolation circuit, the isolation circuit is connected between the control terminal of the driving circuit and the storage circuit, and is configured to disconnect a connection between the control terminal of the driving circuit and the storage circuit under control of an isolation control signal in a case where the data writing circuit writes the coupling voltage based on the data voltage into the control terminal of the driving circuit.

For example, in the pixel circuit provided by at least one embodiment of the present disclosure, the isolation circuit comprises an isolation transistor, a first electrode of the isolation transistor is connected to the control terminal of the driving circuit, a second electrode of the isolation transistor is connected to the storage circuit, and a gate electrode of the isolation transistor is configured to receive the isolation control signal.

For example, in the pixel circuit provided by at least one embodiment of the present disclosure, a phase of the isolation control signal is opposite to a phase of the second scanning sub-signal.

For example, the pixel circuit provided by at least one embodiment of the present disclosure further comprises a second reset circuit, the second reset circuit is connected to a first terminal of the light-emitting element and is configured to write a third reset voltage to the first terminal of the light-emitting element under control of a second reset control signal to reset the first terminal of the light-emitting element.

For example, in the pixel circuit provided by at least one embodiment of the present disclosure, the second reset circuit comprises a second reset transistor, a first electrode of the second reset transistor is connected to the first terminal of the light-emitting element, a second electrode of the second reset transistor is configured to receive the third reset voltage, and a gate electrode of the second reset transistor is configured to receive the second reset control signal.

For example, in the pixel circuit provided by at least one embodiment of the present disclosure, the first reset voltage and the third reset voltage are identical.

For example, the pixel circuit provided by at least one embodiment of the present disclosure further comprises a first light-emitting control circuit, the first light-emitting control circuit is connected to a first terminal of the light-emitting element and the second terminal of the driving circuit, and is configured to control a connection between the first terminal of the light-emitting element and the second terminal of the driving circuit to be disconnected or connected under control of a first light-emitting control signal.

For example, in the pixel circuit provided by at least one embodiment of the present disclosure, the first light-emitting control circuit comprises a first light-emitting control transistor, a gate electrode of the first light-emitting control transistor is configured to receive the first light-emitting control signal, a first electrode of the first light-emitting control transistor is connected to the second terminal of the driving circuit, and a second electrode of the first light-emitting control transistor is connected to the first terminal of the light-emitting element.

For example, the pixel circuit provided by at least one embodiment of the present disclosure further comprises a second light-emitting control circuit, the second light-emitting control circuit is connected to a first power supply line and the first terminal of the driving circuit, and is configured to control a connection between the first terminal of the driving circuit and the first power supply line to be disconnected or connected under control of a second light-emitting control signal.

For example, in the pixel circuit provided by at least one embodiment of the present disclosure, the second light-emitting control circuit comprises a second light-emitting control transistor, a gate electrode of the second light-emitting control transistor is configured to receive the second light-emitting control signal, a first electrode of the second light-emitting control transistor is connected to the first power supply line, and a second electrode of the second light-emitting control transistor is connected to the first terminal of the driving circuit.

For example, in the pixel circuit provided by at least one embodiment of the present disclosure, the driving circuit comprises a driving transistor, the control terminal of the driving circuit comprises a control electrode of the driving transistor, the first terminal of the driving circuit comprises a first electrode of the driving transistor, and the second terminal of the driving circuit comprises a second electrode of the driving transistor.

At least one embodiment of the present disclosure further provides a pixel circuit comprising: a data writing circuit, a driving circuit, a compensation circuit, a storage circuit, a first reset circuit, a second reset circuit, a first light-emitting control circuit, and a second light-emitting control circuit; the driving circuit comprises a driving transistor, the data writing circuit comprises a first data writing sub-circuit and a second data writing sub-circuit, the first data writing sub-circuit comprises a first data writing transistor, and the second data writing sub-circuit comprises a second data writing transistor and a first capacitor, a first electrode of the first data writing transistor is configured to receive a data voltage, a second electrode of the first data writing transistor is connected to a data writing node, a gate electrode of the first data writing transistor is configured to receive a first scanning sub-signal, a first electrode of the first capacitor is connected to the data writing node, a second electrode of the first capacitor is connected to a first electrode of the second data writing transistor, a second electrode of the second data writing transistor is connected to a gate electrode of the driving transistor, and a gate electrode of the second data writing transistor is configured to receive a second scanning sub-signal; the compensation circuit comprises a first compensation sub-circuit and a second compensation sub-circuit, the first compensation sub-circuit comprises a first compensation transistor, and the second compensation sub-circuit comprises a second compensation transistor, a first electrode of the first compensation transistor is configured to receive a first reset voltage, a second electrode of the first compensation transistor is connected to a second electrode of the driving transistor, and a gate electrode of the first compensation transistor is configured to receive a first compensation control sub-signal; a first electrode of the second compensation transistor is connected to a first electrode of the driving transistor, a second electrode of the second compensation transistor is connected to the gate electrode of the driving transistor, and a gate electrode of the second compensation transistor is configured to receive a second compensation control sub-signal; the first reset circuit comprises a first reset transistor, a first electrode of the first reset transistor is configured to receive a second reset voltage, a second electrode of the first reset transistor is connected to the data writing node, and a gate electrode of the first reset transistor is configured to receive a first reset control signal, the storage circuit comprises a second capacitor, a first electrode of the second capacitor is connected to the gate electrode of the driving transistor, and a second electrode of the second capacitor is connected to a first terminal of a light-emitting element, the second reset circuit comprises a second reset transistor, a first electrode of the second reset transistor is connected to the first terminal of the light-emitting element, a second electrode of the second reset transistor is configured to receive a third reset voltage, and a gate electrode of the second reset transistor is configured to receive a second reset control signal; the first light-emitting control circuit comprises a first light-emitting control transistor, a gate electrode of the first light-emitting control transistor is configured to receive a first light-emitting control signal, a first electrode of the first light-emitting control transistor is connected to the second electrode of the driving transistor, and a second electrode of the first light-emitting control transistor is connected to the first terminal of the light-emitting element; and the second light-emitting control circuit comprises a second light-emitting control transistor, a gate electrode of the second light-emitting control transistor is configured to receive a second light-emitting control signal, a first electrode of the second light-emitting control transistor is connected to a first power supply line, and a second electrode of the second light-emitting control transistor is connected to the first electrode of the driving transistor.

For example, the pixel circuit provided by at least one embodiment of the present disclosure further comprises an isolation circuit, the isolation circuit comprises an isolation transistor, the second capacitor is connected to the gate electrode of the driving transistor through the isolation transistor, a first electrode of the isolation transistor is connected to the gate electrode of the driving transistor, a second electrode of the isolation transistor is connected to the first electrode of the second capacitor, and a gate electrode of the isolation transistor is configured to receive an isolation control signal.

At least one embodiment of the present disclosure further provides a driving method applied to the pixel circuit according to any embodiment of the present disclosure, the driving method comprises: in a compensation stage, writing the compensation voltage based on the first reset voltage into the control terminal of the driving circuit; in a data writing stage, writing the coupling voltage based on the data voltage into the control terminal of the driving circuit; and in a light-emitting stage, driving the light-emitting element to emit light based on the voltage applied to the control terminal of the driving circuit.

For example, in the driving method provided by at least one embodiment of the present disclosure, in a case where the data writing circuit comprises a first data writing sub-circuit and a second data writing sub-circuit, the first data writing sub-circuit is connected to a data writing node, and the second data writing sub-circuit is connected to the data writing node and the control terminal of the driving circuit, the driving method comprises: in the compensation stage, writing a second reset voltage into the data writing node to reset the data writing node.

For example, the driving method provided by at least one embodiment of the present disclosure further comprises: in a reset stage, resetting a first terminal of the light-emitting element.

At least one embodiment of the present disclosure further provides a display panel comprising the pixel circuit according to any embodiment of the present disclosure.

At least one embodiment of the present disclosure further provides a display device comprising the display panel according to any embodiment of the present disclosure.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions, and advantages of the embodiments of the present disclosure more apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise." "comprising." "include." "including." etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right." "left" and the like are only used to indicate relative position relationship, and when the position of the object which is described is changed, the relative position relationship may be changed accordingly.

Figure 1:
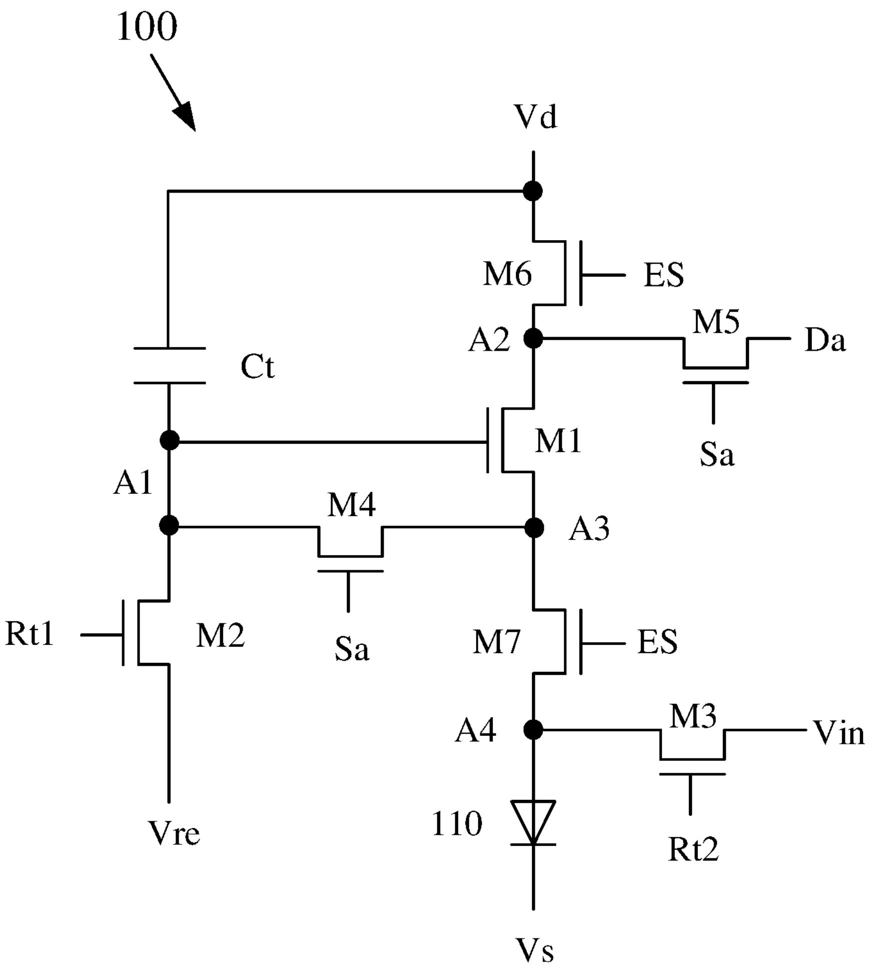
FIG. 1 is a schematic structural diagram of a pixel circuit.

FIG. 1 is a schematic structural diagram of a pixel circuit.

As shown in FIG. 1, the pixel circuit 100 has a 7T1C (i.e., seven transistors and one capacitor) structure, and the pixel circuit 100 includes a first transistor M1 to a seventh transistor M7 and a storage capacitor Ct. The first transistor M1 is a driving transistor and is configured to generate a driving current for driving a light-emitting element 110 to emit light. For example, a gate electrode of the first transistor M1 is coupled to a node A1, a first electrode of the first transistor M1 is coupled to a node A2, a second electrode of the first transistor M1 is coupled to a node A3, a gate electrode of the second transistor M2 is configured to receive a control signal Rt1, a first electrode of the second transistor M2 is configured to receive a reset voltage Vre, and a second electrode of the second transistor M2 is coupled to the node A1. A gate electrode of the third transistor M3 is configured to receive a control signal Rt2, a first electrode of the third transistor M3 is configured to receive an initial voltage Vin, a second electrode of the third transistor M3 is coupled to a node A4. A gate electrode of the fourth transistor M4 and a gate electrode of the fifth transistor M5 are configured to receive a control signal Sa, a first electrode of the fourth transistor M4 is coupled to the node A3, and a second electrode of the fourth transistor M4 is coupled to the node A1. A first electrode of the fifth transistor M5 is configured to receive a data signal Da, a second electrode of the fifth transistor M5 is coupled to the node A2. A first electrode of the sixth transistor M6 is coupled to a power supply line Vd, a second electrode of the sixth transistor M6 is coupled to the node A2, a gate electrode of the sixth transistor M6 and a gate electrode of the seventh transistor M7 are configured to receive the control signal ES, a first electrode of the seventh transistor M7 is coupled to the node A3, a second electrode of the seventh transistor M7 is coupled to the node A4, an anode of the light-emitting element 110 is coupled to the node A4, a cathode of the light-emitting element 110 is coupled to a power supply line Vs. A first electrode of the storage capacitor Ct is coupled to the node A1, and a second electrode of the storage capacitor Ct is coupled to the power supply line Vd.

As shown in FIG. 1, the first electrode of the first transistor M1, the second electrode of the fifth transistor M5, and the second electrode of the sixth transistor M6 are all coupled to the node A2, that is, the first electrode of the first transistor M1, the second electrode of the fifth transistor M5, and the second electrode of the sixth transistor M6 are electrically connected with each other; the second electrode of the first transistor M1, the first electrode of the fourth transistor M4, and the first electrode of the seventh transistor M7 are all coupled to the node A3, that is, the second electrode of the first transistor M1, the first electrode of the fourth transistor M4, and the first electrode of the seventh transistor M7 are electrically connected with each other; the second electrode of the third transistor M3, the second electrode of the seventh transistor M7, and the anode of the light-emitting element 110 are all coupled to the node A4, that is, the second electrode of the third transistor M3, the second electrode of the seventh transistor M7, and the anode of the light-emitting element 110 are electrically connected with each other; the gate electrode of the first transistor M1, the second electrode of the second transistor M2, the second electrode of the fourth transistor M4, and the first electrode of the storage capacitor Ct are all coupled to the node A1, that is, the gate electrode of the first transistor M1, the second electrode of the second transistor M2, the second electrode of the fourth transistor M4, and the first electrode of the storage capacitor Ct are electrically connected to each other.

For example, the pixel circuit 100 is a circuit based on LTPO (Low Temperature Polycrystalline Oxide) technology, that is, the pixel circuit 100 includes an oxide thin film transistor and a low temperature polysilicon thin film transistor. For example, the pixel circuit 100 includes two oxide (for example, indium gallium zinc oxide (IGZO)) thin film transistors and five low temperature polysilicon (LTPS) thin film transistors. For example, the second transistor M2 and the fourth transistor M4 are IGZO thin film transistors, and the first transistor M1, the third transistor M3, the fifth transistor M5, the sixth transistor M6, and the seventh transistor M6 are LTPS thin film transistors.

For example, the driving process of the pixel circuit 100 shown in FIG. 1 includes a reset stage, a data writing compensation stage, and a light-emitting stage.

In the reset stage, under control of the control signal Rt1, the second transistor M2 is turned on, the reset voltage Vre is provided to the node A1, that is, the gate electrode of the first transistor M1, via the second transistor M2, thereby resetting the gate electrode of the first transistor M1; under control of the control signal Rt2, the third transistor M3 is turned on, the initial voltage Vin is provided to the node A4, that is, the anode of the light-emitting element 110, via the third transistor M3, thereby resetting the anode of the light-emitting element 110. In the reset stage, the remaining transistors M1 and M4 to M7 in the pixel circuit 100 are turned off. In the reset stage, the voltage at the node A1 is the reset voltage Vre, and the voltage at the node A4 is the initial voltage Vin.

In the data writing compensation stage, under control of the control signal Sa, both the fourth transistor M4 and the fifth transistor M5 are turned on. Because the fourth transistor M4 is turned on, the gate electrode and the second electrode of the first transistor M1 are electrically connected to each other, so that the first transistor M1 is in a diode-connected state and in a saturated state. The data signal Da may charge the storage capacitor Ct through the fifth transistor M5, the first transistor M1, and the fourth transistor M4 in sequence until the voltage at the node A1 is Da+Vth, and Vth represents the threshold voltage of the first transistor M1, thereby implementing threshold compensation for the first transistor M1. In the data writing compensation stage, the remaining transistors M2~M3 and M6~M7 in the pixel circuit 100 are all turned off. In the data writing compensation stage, the voltage at the node A1 changes from the reset voltage Vin to the voltage Da+Vth.

In the light-emitting stage, under control of the control signal ES, both the sixth transistor M6 and the seventh transistor M7 are turned on, the current channel from the power supply line Vd to the power supply line Vs is turned on, and the driving current generated by the first transistor M1 may be transmitted to the light-emitting element 110 via the turned-on first transistor T1, the turned-on sixth transistor M6, and the turned-on seventh transistor M7 to drive the light-emitting element 110 to emit light.

In the pixel circuit 100 shown in FIG. 1, data writing and threshold compensation are carried out at the same time. For the high-frequency drive display mode, the compensation time of the pixel circuit is insufficient, and the brightness of the display panel is uneven, thus affecting the display effect of the display panel.

At present, when the mobility (Mob) of the oxide transistor changes, the driving current of the oxide transistor changes greatly, and the driving current of the oxide transistor is small, which causes the fluctuation of the mobility (Mob) of the oxide transistor to have a great influence on the luminous brightness, while for the low-temperature polycrystalline silicon transistor, when the Mob of the low-temperature polycrystalline silicon transistor changes, the driving current of the low-temperature polycrystalline silicon transistor changes little, thus having little influence on the charging. The mobility (Mob) of the oxide transistor is low, which will cause that the compensation stage of the threshold voltage of the oxide transistor is relatively slow. In view of this characteristic, it is necessary to optimize the circuit, and the problem of the low mobility is compensated by extending the threshold compensation time.

At least one embodiment of the present disclosure provides a pixel circuit, and the pixel circuit includes a data writing circuit, a driving circuit, and a compensation circuit. The driving circuit comprises a control terminal, a first terminal, and a second terminal, the compensation circuit is connected to the control terminal, the first terminal, and the second terminal of the driving circuit, and is configured to write a compensation voltage based on a first reset voltage into the control terminal of the driving circuit under control of a compensation control signal; the data writing circuit is connected to the control terminal of the driving circuit and is configured to write a coupling voltage based on a data voltage into the control terminal of the driving circuit under control of a scanning signal; and the driving circuit is configured to control a driving current for driving a light-emitting element to emit light under control of a voltage applied to the control terminal of the driving circuit.

In the pixel circuit provided by the embodiment of the present disclosure, the time period of threshold compensation is separated from the time period of data writing through the data writing circuit and the compensation circuit, so that the compensation time of threshold compensation is prolonged, the effect of threshold compensation is improved, and the purpose of full compensation is achieved, so that the compensation time is independent of the refresh rate and resolution of the display panel, thus ameliorating the influence of the technology on the image quality, ameliorating the display brightness uniformity of the display panel, and improving the display effect.

At least one embodiment of the present disclosure also provides a driving method for driving the above-mentioned pixel circuit, and a display panel and a display device including the above-mentioned pixel circuit.

Embodiments of the present disclosure will be described in detail with reference to the accompanying drawings, but the present disclosure is not limited to these specific embodiments. In order to keep the following description of the embodiments of the present disclosure clear and concise, detailed descriptions of some known functions and known components are omitted in the present disclosure. When any component of an embodiment of the present invention appears in more than one drawing, the component is represented by the same reference numeral in each drawing.

Figure 2A:
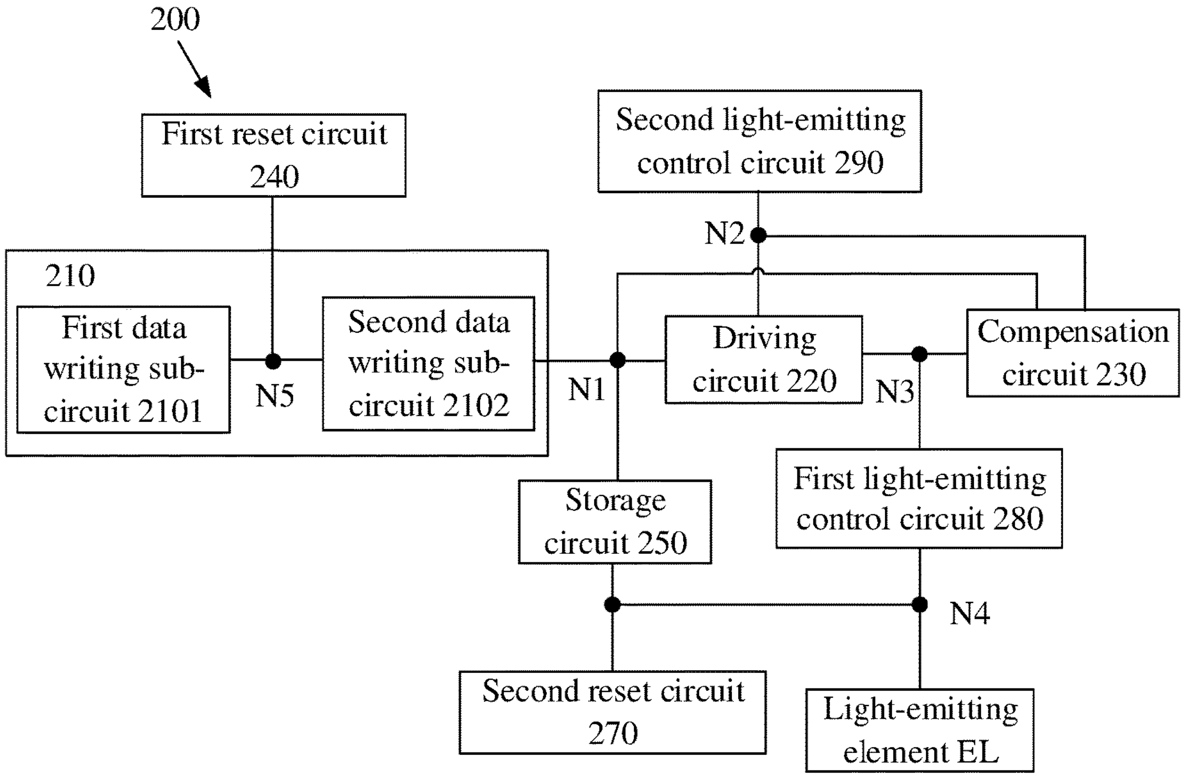
FIG. 2A is a schematic diagram of a pixel circuit provided by at least one embodiment of the present disclosure.
Figure 2B:
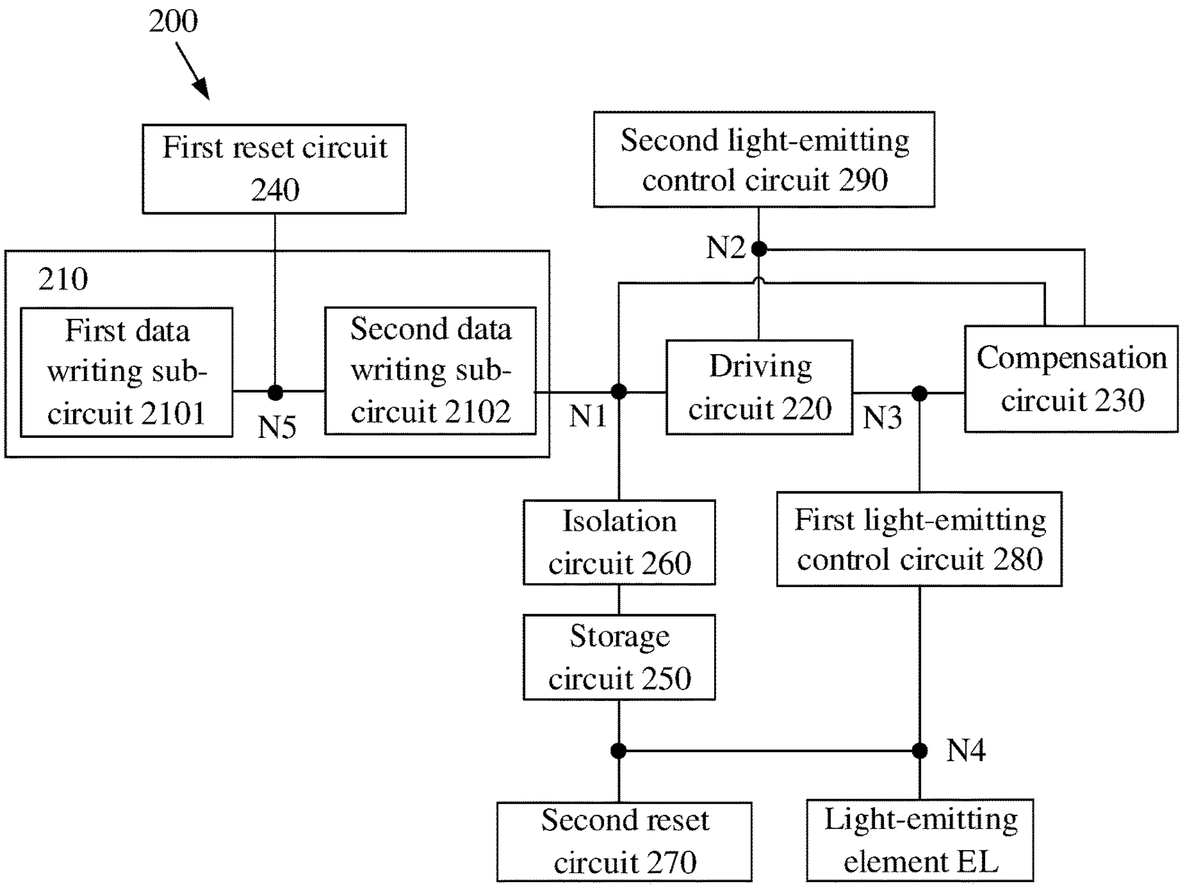
FIG. 2B is a schematic diagram of another pixel circuit provided by at least one embodiment of the present disclosure.
Figure 3A:
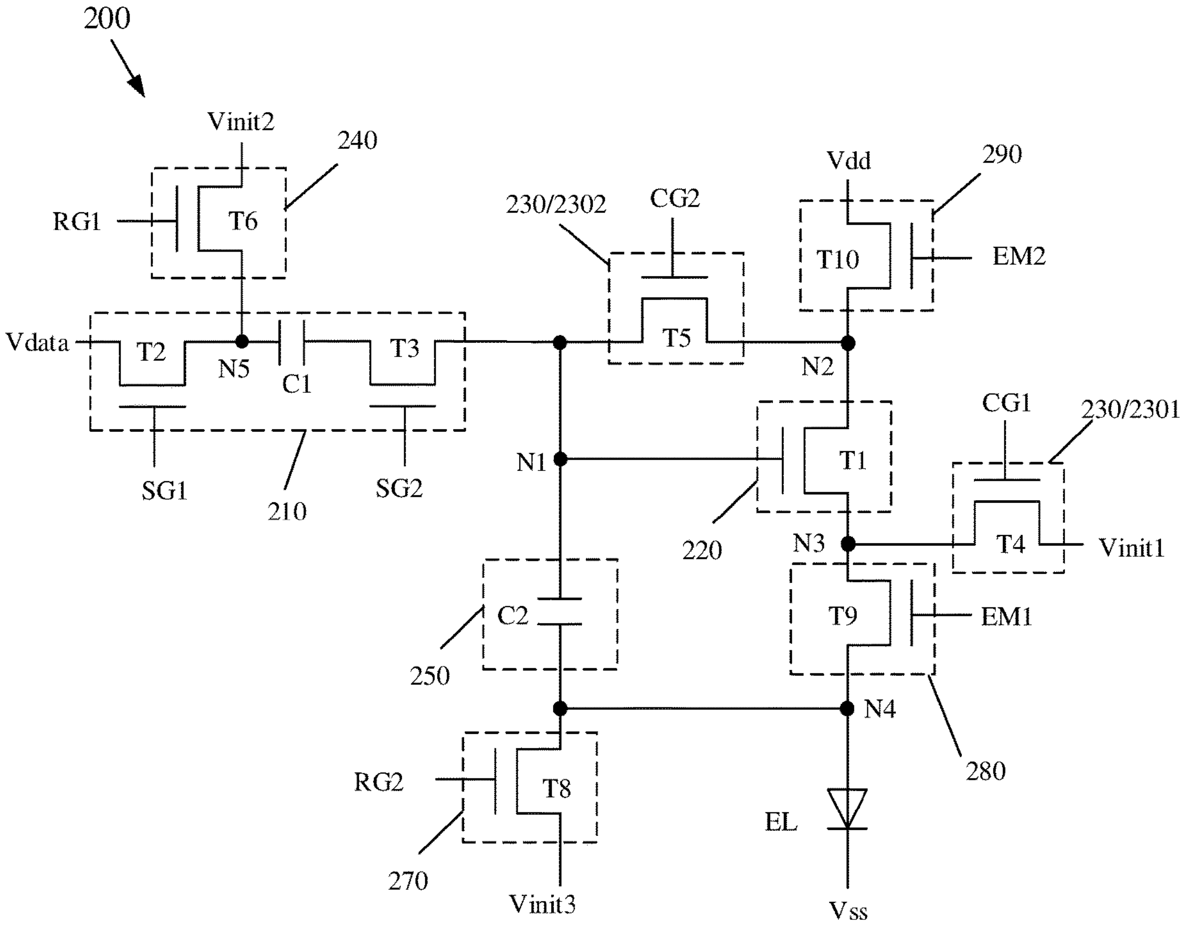
FIG. 3A is a schematic structural diagram of a pixel circuit provided by at least one embodiment of the present disclosure.
Figure 3B:
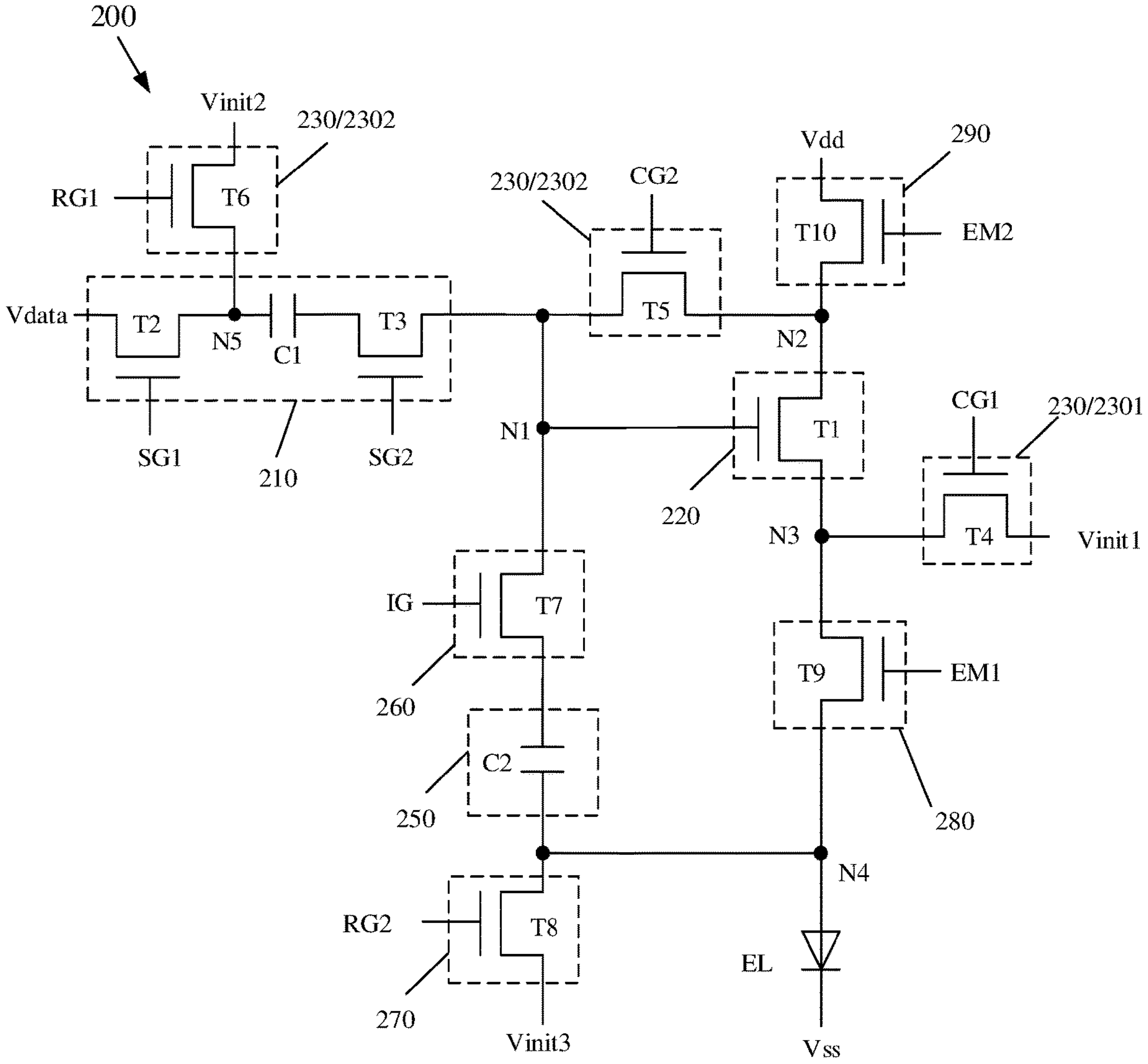
FIG. 3B is a schematic structural diagram of another pixel circuit provided by at least one embodiment of the present disclosure.

FIG. 2A is a schematic diagram of a pixel circuit provided by at least one embodiment of the present disclosure, FIG. 2B is a schematic diagram of another pixel circuit provided by at least one embodiment of the present disclosure, FIG. 3A is a schematic structural diagram of a pixel circuit provided by at least one embodiment of the present disclosure, and FIG. 3B is a schematic structural diagram of another pixel circuit provided by at least one embodiment of the present disclosure. For example, FIG. 3A is a schematic structural diagram of an example of the pixel circuit shown in FIG. 2A, and FIG. 3B is a schematic structural diagram of an example of the pixel circuit shown in FIG. 2B.

For example, as shown in FIG. 2A and FIG. 2B, the pixel circuit 200 includes a data writing circuit 210, a driving circuit 220, and a compensation circuit 230. For example, the pixel circuit 200 is configured to drive a light-emitting element EL to emit light.

For example, the pixel circuit 200 provided by the embodiment of the present disclosure may be applied to a display panel, such as an OLED display panel (for example, an AMOLED display panel) and the like.

For example, as shown in FIG. 2A and FIG. 2B, the driving circuit 220 includes a control terminal, a first terminal, and a second terminal. For example, the control terminal of the driving circuit 220 is electrically connected to a first node N1, the first terminal of the driving circuit 220 is electrically connected to a second node N2, and the second terminal of the driving circuit 220 is electrically connected to a third node N3.

For example, the compensation circuit 230 is connected to the control terminal, the first terminal, and the second terminal of the driving circuit 210, that is, to the first node N1, the second node N2, and the third node N3, and is configured to write the compensation voltage based on the first reset voltage into the control terminal of the driving circuit 210 under control of the compensation control signal; the data writing circuit 210 is connected to the control terminal of the driving circuit 220, that is, to the first node N1, and is configured to write the coupling voltage based on the data voltage into the control terminal of the driving circuit 220 under control of the scanning signal; the driving circuit 220 is configured to control a driving current for driving the light-emitting element EL to emit light under control of a voltage applied to the control terminal of the driving circuit 220.

For example, the voltage at the control terminal of the driving circuit 220 is related to the compensation voltage and the coupling voltage.

It should be noted that in the embodiment of the present disclosure, "connected" means electrically connected.

For example, the light-emitting element EL may be a light-emitting diode or the like. The light-emitting diode may be a Micro light-emitting diode (Micro LED), an organic light-emitting diode (OLED), a quantum dot light-emitting diode (QLED), or the like. The light-emitting element EL is configured to receive a light-emitting signal (which may be the above-mentioned driving current, for example) during operation, and emit light with an intensity corresponding to the light-emitting signal. For example, the light-emitting element EL may adopt different light-emitting materials to emit light of different colors, thereby performing color light emission.

For example, the light-emitting element EL may include a first electrode, a second electrode, and a light-emitting layer disposed between the first electrode and the second electrode. The first electrode of the light-emitting element EL may be an anode, and the second electrode of the light-emitting diode may be a cathode. It should be noted that in the embodiments of the present disclosure, the light-emitting layer of the light-emitting element may include the electroluminescent layer itself and other common layers located on both sides of the electroluminescent layer, such as a hole injection layer, a hole transport layer, an electron injection layer, an electron transport layer, and the like. Generally, the light-emitting element EL has a light-emitting threshold voltage and emits light when the voltage between the first electrode and the second electrode of the light-emitting element EL is greater than or equal to the light-emitting threshold voltage. In practical application, the specific structure of the light-emitting element EL may be designed and determined according to the actual application scenario, which is not limited here.

For example, as shown in FIG. 3A and FIG. 3B, the first electrode of the light-emitting element EL is connected to the fourth node N4, and the second electrode of the light-emitting element EL is connected to a second power supply line Vss.

For example, as shown in FIG. 3A and FIG. 3B, the driving circuit 220 may include a driving transistor T1, a gate electrode of the driving transistor T1 is the control terminal of the driving circuit 220, a first electrode of the driving transistor T1 is the first terminal of the driving circuit 220, and a second electrode of the driving transistor T1 is the second terminal of the driving circuit 220, that is, the gate electrode of the driving transistor T1 is connected to the first node N1, the first electrode of the driving transistor T1 is connected to the second node N2, and the second electrode of the driving transistor T1 is connected to the third node N3.

For example, in some embodiments, as shown in FIG. 2A and FIG. 2B, the data writing circuit 210 may include a first data writing sub-circuit 2101 and a second data writing sub-circuit 2102. The scanning signal includes a first scanning sub-signal and a second scanning sub-signal, and the first data writing sub-circuit 2101 is connected to a data writing node N5 and is configured to write a data voltage into the data writing node N5 under control of the first scanning sub-signal; the second data writing sub-circuit 2102 is connected to the data writing node N5 and the control terminal of the driving circuit 220 (i.e., the first node N1), and is configured to write the coupling voltage based on the voltage of the data writing node N5 into the control terminal of the driving circuit 220 under control of the second scanning sub-signal. For example, the voltage of the data writing node N5 is obtained based on the data voltage and may include the data voltage.

For example, in some embodiments, as shown in FIG. 3A and FIG. 3B, the first data writing sub-circuit 2101 includes a first data writing transistor T2, and the second data writing sub-circuit 2102 includes a second data writing transistor T3 and a first capacitor C1.

For example, a first electrode of the first data writing transistor T2 is configured to receive the data voltage Vdata. For example, the first electrode of the first data writing transistor T2 may be connected to a data line Vdata to receive the data voltage Vdata, the second electrode of the first data writing transistor T2 is connected to the data writing node N5, and a gate electrode of the first data writing transistor T2 is configured to receive the first scanning sub-signal, for example, the gate electrode of the first data writing transistor T2 may be connected to a first scanning signal line SG1 to receive the first scanning sub-signal SG1.

For example, a first electrode of the first capacitor C1 is connected to the data writing node N5, a second electrode of the first capacitor C1 is connected to a first electrode of the second data writing transistor T3, a second electrode of the second data writing transistor T3 is connected to the control terminal of the driving circuit 220, that is, the first node N1, and a gate electrode of the second data writing transistor T3 is configured to receive the second scanning sub-signal SG2. For example, the gate electrode of the second data writing transistor T3 may be connected to the second scanning signal line SG2 to receive the second scanning sub-signal.

For example, the first scanning sub-signal SG1 and the second scanning sub-signal SG2 are the same. In some examples, the gate electrode of the first data writing transistor T2 and the gate electrode of the second data writing transistor T3 may be connected to the same signal line (i.e., the first scanning signal line SG1 and the second scanning signal line SG2 are the same signal line) to receive the same scanning signal (i.e., the first scanning sub-signal SG1 or the second scanning sub-signal SG2), so that the number of signal lines can be saved, and the circuit structure can be simplified, the circuit layout space can be optimized, and the cost can be saved. However, the present disclosure is not limited to this, the gate electrode of the first data writing transistor T2 and the gate electrode of the second data writing transistor T3 may also be connected to different signal lines (i.e., the first scanning signal line SG1 and the second scanning signal line SG2 are two different signal lines), so that the first data writing transistor T2 and the second data writing transistor T3 can be separately and independently controlled. For example, the different signal lines output the same signal.

It should be noted that the first scanning sub-signal SG1 received by the gate electrode of the first data writing transistor T2 and the second scanning sub-signal SG2 received by the gate electrode of the second data writing transistor T3 may also be different, which is specifically determined according to the types of the first data writing transistor T2 and the second data writing transistor T3 and the driving timing of the pixel circuit 200, and the present disclosure does not specifically limit this.

For example, in some embodiments, as shown in FIG. 2A and FIG. 2B, the compensation circuit 230 is connected to the first node N1, the second node N2, and the third node N3. For example, as shown in FIG. 3A and FIG. 3B, the compensation circuit 230 includes a first compensation sub-circuit 2301 and a second compensation sub-circuit 2301, and the compensation control signal includes a first compensation control sub-signal CG1 and a second compensation control sub-signal CG2.

For example, the first compensation sub-circuit 2301 is connected to the second terminal (i.e., the third node N3) of the driving circuit 220, and is configured to write the first reset voltage Vinit1 into the second terminal of the driving circuit 220 under control of the first compensation control sub-signal CG1. The second compensation sub-circuit 2302 is connected to the first terminal of the driving circuit 220 (i.e. the second node N2) and the control terminal of the driving circuit 220 (i.e. the first node N1), and is configured to write the compensation voltage into the control terminal of the driving circuit 220 under control of the second compensation control sub-signal CG2. For example, the second compensation sub-circuit 2302 controls the connection between the first terminal of the driving circuit 220 and the control terminal of the driving voltage 220 to be turned on or off under control of the second compensation control sub-signal CG2.

For example, in some embodiments, as shown in FIG. 3A and FIG. 3B, the first compensation sub-circuit 2301 includes a first compensation transistor T4 and the second compensation sub-circuit 2302 includes a second compensation transistor T5. A first electrode of the first compensation transistor T4 is configured to receive the first reset voltage Vinit1, for example, the first electrode of the first compensation transistor T4 is connected to a first reset voltage line Vinit1 to receive the first reset voltage Vinit1, that is, the first reset voltage line Vinit1 is used for transmitting the first reset voltage Vinit1 to the first electrode of the first compensation transistor T4. A second electrode of the first compensation transistor T4 is connected to the second terminal of the driving circuit 220, that is, the third node N3, and the gate electrode of the first compensation transistor T4 is configured to receive the first compensation control sub-signal CG1. For example, the gate electrode of the first compensation transistor T4 is connected to the first compensation control signal line CG1 to receive the first compensation control sub-signal CG1.

In the embodiments of the present disclosure, the data voltage is written by the data writing circuit 210, and the threshold compensation is implemented by the compensation circuit 230, for example, the data writing circuit 210 writes the coupling voltage based on the data voltage into the control terminal of the driving circuit 200 in the data writing stage, and the compensation circuit 230 writes the compensation voltage based on the first reset voltage into the control terminal of the driving circuit 200 in the compensation stage different from the data writing stage. The threshold compensation and the data writing are implemented in two independent stages through two different circuits, and do not affect each other, so as to avoid the limitation of the time of the data writing on the time of the threshold compensation. For example, the effective time of the first compensation control sub-signal CG1 may determine the time for compensation, and by controlling the effective time of the first compensation control sub-signal CG1, the time length of threshold compensation can be controlled, so as to achieve to prolong the compensation time of threshold compensation, thus improving the threshold compensation effect and ameliorating the influence, brought by the technology, on the image quality.

For example, in some embodiments, as shown in FIG. 3A and FIG. 3B, a first electrode of the second compensation transistor T5 is connected to the first terminal of the driving circuit 220, that is, the second node N2, a second electrode of the second compensation transistor T5 is connected to the control terminal of the driving circuit 220, that is, the first node N1, and a gate electrode of the second compensation transistor T5 is configured to receive the second compensation control sub-signal CG2, for example, the gate electrode of the second compensation transistor T5 is connected to the second compensation control signal line CG2 to receive the second compensation control sub-signal CG2.

For example, the first compensation control sub-signal CG1 and the second compensation control sub-signal CG2 are different, and the first compensation control signal line CG1 and the second compensation control signal line CG2 are two different signal lines.

For example, as shown in FIG. 2A and FIG. 2B, the pixel circuit 200 further includes a first reset circuit 240, the first reset circuit 240 is connected to the data writing node N5 and is configured to write a second reset voltage to the data writing node N5 under control of the first reset control signal to reset the data writing node N5. The first reset circuit 240 is used to reset the data writing node N5, so as to avoid the influence of the data voltage written into the data writing node N5 in the previous frame on the display of the current frame and avoid display errors.

For example, in some embodiments, as shown in FIG. 3A and FIG. 3B, the first reset circuit 240 includes a first reset transistor T6, a first electrode of the first reset transistor T6 is configured to receive the second reset voltage Vinit2, for example, the first electrode of the first reset transistor T6 is connected to the second reset voltage line Vinit2 to receive the second reset voltage Vinit2, that is, the second reset voltage line Vinit2 is used to transmit the second reset voltage Vinit2 to the first electrode of the first reset transistor T6, a second electrode of the first reset transistor T6 is connected to the data writing node N5, and a gate electrode of the first reset transistor T6 is configured to receive the first reset control signal RG1. For example, the gate electrode of the first reset transistor T6 is connected to the first reset control signal line RG1 to receive the first reset control signal RG1.

For example, in some embodiments, the first reset voltage Vinit1 and the second reset voltage Vinit2 may be the same, and at this time, the first reset voltage line Vinit1 and the second reset voltage line Vinit2 may be the same signal line, thereby saving the number of signal lines, reducing the complexity of the circuit, and saving the cost. However, the present disclosure is not limited to this, the first reset voltage line Vinit1 and the second reset voltage line Vinit2 may be different signal lines, in this case, the first reset voltage Vinit1 and the second reset voltage Vinit2 may be the same or different.

For example, as shown in FIG. 2A and FIG. 2B, in some embodiments, the pixel circuit 200 may further include a storage circuit 250. For example, the storage circuit 250 is connected to the control terminal of the driving circuit 220 and the first terminal of the light-emitting element EL (i.e., the first electrode of the light-emitting element EL, namely the fourth node N4), and is configured to store the voltage of the control terminal of the driving circuit 220.

For example, in some embodiments, as shown in FIG. 3A and FIG. 3B, the storage circuit 250 may include a second capacitor C2, a first electrode of the second capacitor C2 is connected to the control terminal of the driving circuit 220, that is, the first node N1, and a second electrode of the second capacitor C2 is connected to the first terminal of the light-emitting element EL, that is, the fourth node N4. As shown in FIG. 3A, in some examples, the first electrode of the second capacitor C2 is directly connected to the first node N1.

For example, in some embodiments, as shown in FIG. 2B, the pixel circuit 200 further includes an isolation circuit 260. The isolation circuit 260 is connected between the control terminal of the driving circuit 220 and the storage circuit 250, and is configured to, under control of the isolation control signal, turn off the connection between the control terminal of the driving circuit 220 and the storage circuit 250 when the data writing circuit 210 writes the coupling voltage based on the data voltage into the control terminal of the driving circuit 220.

For example, the isolation circuit 260 may isolate the control terminal of the driving circuit 220 from the storage circuit 250, so as to avoid the coupling effect of the second capacitor C2 in the storage circuit 250 from affecting the voltage at the first node N1 when the coupling voltage is written into the control terminal of the driving circuit 220, avoid the second capacitor C2 in the storage circuit 250 from affecting the coupling voltage written to the control terminal of the driving circuit 220, and avoid the first capacitor and the second capacitor from affecting the data range. The data range represents the difference between the data voltage in the white state and the data voltage in the black state and can determine the overall brightness of the display panel controlled by the driving chip (IC).

For example, in some embodiments, as shown in FIG. 3B, the isolation circuit 260 includes an isolation transistor T7, a first electrode of the isolation transistor T7 is connected to the control terminal of the driving circuit 220, that is, the first node N1, a second electrode of the isolation transistor T7 is connected to the storage circuit 250, for example, to the first electrode of the second capacitor C2, and a gate electrode of the isolation transistor T7 is configured to receive an isolation control signal IG. For example, the gate electrode of the isolation transistor T7 may be connected to an isolation control signal line IG to receive the isolation control signal IG.

For example, in some embodiments, the type of the isolation transistor T7 is the same as the type of the second data writing transistor T3, in this case, the phase of the isolation control signal IG is opposite to that of the second scanning sub-signal SG2, so that when the second data writing transistor T3 is turned on, the isolation transistor T7 is turned off.

For example, in other embodiments, the type of the isolation transistor T7 is different from that of the second data writing transistor T3. For example, the isolation transistor T7 is a P-type transistor and the second data writing transistor T3 is an N-type transistor. In this case, the phase of the isolation control signal IG and the phase of the second scanning sub-signal SG2 may be the same, or the isolation control signal IG and the second scanning sub-signal SG2 may be the same signal. In this case, the isolation control signal line and the second scanning signal line may be the same signal line, so as to save the number of signal lines.

It should be noted that the present disclosure does not specifically limit the isolation control signal IG and the second scanning sub-signal SG2, as long as the isolation circuit 260 can disconnect the connection between the control terminal of the driving circuit 220 and the storage circuit 250 when the data writing circuit 210 writes the coupling voltage based on the data voltage to the control terminal of the driving circuit 220.

For example, as shown in FIG. 2A and FIG. 2B, the pixel circuit 200 may further include a second reset circuit 270. The second reset circuit 270 is connected to the first terminal of the light-emitting element EL, that is, the fourth node N4, and is configured to write a third reset voltage into the first terminal of the light-emitting element EL under control of a second reset control signal to reset the first terminal of the light-emitting element EL.

For example, in some embodiments, as shown in FIG. 3A and FIG. 3B, the second reset circuit 270 includes a second reset transistor T8, a first electrode of the second reset transistor T8 is connected to the first terminal of the light-emitting element EL, a second electrode of the second reset transistor T8 is configured to receive the third reset voltage Vinit3. For example, the second electrode of the second reset transistor T8 may be connected to the third reset voltage line Vinit3 to receive the third reset voltage Vinit3, that is, the third reset voltage line Vinit3 is used to transmit the third reset voltage Vinit3 to the second electrode of the second reset transistor T8. A gate electrode of the second reset transistor T8 is configured to receive the second reset control signal RG2. For example, the gate electrode of the second reset transistor T8 may be connected to the second reset control signal line RG2 to receive the second reset control signal RG2.

For example, in some embodiments, the first reset voltage Vinit1, the second reset voltage Vinit2, and the third reset voltage Vinit3 are the same. In this case, the first reset voltage line Vinit1, the second reset voltage line Vinit2, and the third reset voltage line Vinit3 may be the same signal line, so that the number of signal lines can be saved, the complexity of the circuit can be reduced, and the cost can be saved. However, the present disclosure is not limited to this, at least two selected form a group consisting of the first reset voltage line Vinit1, the second reset voltage line Vinit2, and the third reset voltage line Vinit3 may be different signal lines, and in this case, the first reset voltage Vinit1, the second reset voltage Vinit2, and the third reset voltage Vinit3 may be the same or different.

For example, in some embodiments, the second reset control signal RG2 and the second compensation control sub-signal CG2 are the same, in this case, the second reset control signal line RG2 and the second compensation control signal line CG2 may be the same signal line, so that the number of signal lines can be saved, the complexity of the circuit can be reduced, and the cost can be saved. However, the present disclosure is not limited to this, the second reset control signal line RG2 and the second compensation control signal line CG2 may also be different signal lines, so that the second reset transistor T8 and the second compensation transistor T5 may be separately and independently controlled to increase control flexibility. In this case, the second reset control signal RG2 and the second compensation control sub-signal CG2 may be the same or different.

For example, in some embodiments, the first reset control signal RG1 and the first compensation control sub-signal CG1 may be the same, in this case, the first reset control signal line RG1 and the first compensation control signal line CG1 may be the same signal line, thereby saving the number of signal lines, reducing the complexity of the circuit, and saving the cost. In this case, when both the first compensation transistor T4 and the second compensation transistor T5 are turned on and the compensation voltage based on the first reset voltage is written into the gate electrode of the driving transistor T1, the first reset transistor T6 is also turned on under control of the first reset control signal RG1, and the second reset voltage Vinit2 is written into the data writing node N5 to reset the data writing node N5. However, the present disclosure is not limited to this, the first reset control signal line RG1 and the first compensation control signal line CG1 may also be different signal lines, so that the first reset transistor T6 and the first compensation transistor T4 may be separately and independently controlled to increase control flexibility. In this case, the first reset control signal RG1 and the first compensation control sub-signal CG1 may be the same or different.

For example, in other embodiments, the first reset control signal RG1 and the second reset control signal RG2 may be the same, and in this case, the first reset control signal line RG1 and the second reset control signal line RG2 may be the same signal line, thereby saving the number of signal lines. In this case, when the second reset transistor T8 is turned on under control of the second reset control signal RG2 and the third reset voltage Vinit3 is written to the first terminal of the light-emitting element EL (that is, the fourth node N4) to reset the first terminal of the light-emitting element EL, the first reset transistor T6 is also turned on under control of the first reset control signal RG1, and the second reset voltage Vinit2 is written to the data writing node N5 to reset the data writing node N5, that is, the reset of the data writing node N5 and the reset of the fourth node N4 are implemented simultaneously. However, the present disclosure is not limited to this, the first reset control signal line RG1 and the second reset control signal line RG2 may be different signal lines. In this case, the first reset control signal RG1 and the second reset control signal RG2 may be the same or different.

For example, as shown in FIG. 2A and FIG. 2B, the pixel circuit 200 may further include a first light-emitting control circuit 280. The first light-emitting control circuit 280 is connected to the first terminal of the light-emitting element EL (i.e., the fourth node N4) and the second terminal of the driving circuit 220 (i.e., the third node N3), and is configured to control the connection between the first terminal of the light-emitting element EL and the second terminal of the driving circuit 220 to be turned off or on under control of the first light-emitting control signal.

For example, in some embodiments, as shown in FIG. 3A and FIG. 3B, the first light-emitting control circuit 280 includes a first light-emitting control transistor T9, a gate electrode of the first light-emitting control transistor T9 is configured to receive the first light-emitting control signal EM1. For example, the gate electrode of the first light-emitting control transistor T9 is connected to a first light-emitting control signal line EM1 to receive the first light-emitting control signal EM1, a first electrode of the first light-emitting control transistor T9 is connected to the second terminal of the driving circuit 220, and a second electrode of the first light-emitting control transistor T9 is connected to the first terminal of the light-emitting element EL.

For example, as shown in FIG. 2A and FIG. 2B, the pixel circuit 200 may further include a second light-emitting control circuit 290, the second light-emitting control circuit 290 is connected to the first power supply line Vdd and the first terminal of the driving circuit 220 (i.e., the second node N2) and is configured to control the connection between the first terminal of the driving circuit 220 and the first power supply line Vdd to be turned off or on under control of a second light-emitting control signal.

For example, in some embodiments, as shown in FIG. 3A and FIG. 3B, the second light-emitting control circuit 290 includes a second light-emitting control transistor T10, a gate electrode of the second light-emitting control transistor is configured to receive the second light-emitting control signal EM2. For example, the gate electrode of the second light-emitting control transistor T10 is connected to a second light-emitting control signal line EM2 to receive the second light-emitting control signal EM2, a first electrode of the second light-emitting control transistor T10 is connected to the first power supply line Vdd, and a second electrode of the second light-emitting control transistor T10 is connected to the first terminal of the driving circuit 220, that is, the second node N2.

For example, the first light-emitting control signal line EM1 and the second light-emitting control signal line EM2 are different signal lines. The first light-emitting control signal EM1 and the second light-emitting control signal EM2 are different.

For example, in some embodiments, the display panel includes a plurality of pixel circuits arranged in an array. In this case, the first light-emitting control signal line EM1 is a signal line connected with the pixel circuits of the row where the pixel circuit 200 is located, and the second light-emitting control signal line EM2 is a signal line connected with the pixel circuits of the previous row adjacent to the row where the pixel circuit 200 is located. Therefore, by multiplexing the light-emitting control signal lines, the control of the first light-emitting control transistor T9 and the control of the second light-emitting control transistor T10 in the pixel circuit 200 are achieved, and the number of signal lines in the display panel is saved. For example, if the row where the pixel circuit 200 is located is the second row, the row adjacent to the row where the pixel circuit 200 is located is the first row. In this case, the first light-emitting control signal line EM1 is a signal line connected to the pixel circuits located in the first row, and the second light-emitting control signal line EM2 is a signal line connected to the pixel circuits located in the second row. In this case, the first light-emitting control signal EM1 and the second light-emitting control signal EM2 may be generated by the same gate driving circuit.

For example, in the embodiments of the present disclosure, all transistors T1~T10 may be transistors of the same type, for example, N-type transistors, so that the process complexity of preparing transistors can be reduced. For example, all transistors T1~T10 may be oxide transistors, so that the size of the transistor can be effectively reduced and leakage current can be prevented, and the layout space can be reduced, which is beneficial to the layout with high PPI (Pixels Per Inch unit).

For example, the pixel circuit provided by the embodiment of the present disclosure may be applied to a display panel, and at this time, the switching frequency of the content displayed on the display panel may be 50 Hz, 60 Hz, etc. In this case, the pixel circuit in the display panel is in a high-frequency display mode, that is, the switching frequency is relatively high.

It should be noted that in the embodiments of the present disclosure, each node (the first node N1, the second node N2, the third node N3, the fourth node N4, and the data writing node N5) is set to better describe the circuit structure, and does not represent the actual components. Node represents the junction point of related circuit connections in the circuit structure, that is, elements/circuits connected with the same node identification are electrically connected with each other.

For example, one of the voltage output by the first power supply line Vdd and the voltage output by the second power supply line Vss is a high voltage, and the other is a low voltage. For example, in the embodiment shown in FIG. 3A and FIG. 3B, the voltage output by the first power supply line Vdd is a constant first voltage, and the first voltage is a positive voltage; the voltage output by the second power supply line Vss is a constant second voltage, and the second voltage is a negative voltage. For example, in some examples, the second power supply line Vss may be grounded.

For example, in the specific implementation, in the embodiment of the present disclosure, the third reset voltage Vinit3 and the second voltage Vss output by the second power supply line Vss may satisfy the following formula: $Vinit3-Vss<VEL$, so that the light-emitting element EL can be prevented from emitting light in the non-light-emitting stage (for example, the reset stage, the compensation stage, and the data writing stage to be described below). VEL represents the light-emitting threshold voltage of the light-emitting element EL.

It should be noted that the transistors used in the embodiments of the present disclosure may all be thin-film transistors, field effect transistors, or other switching devices with the same characteristics, the thin-film transistors may include polysilicon thin-film transistors, amorphous silicon thin-film transistors, oxide thin-film transistors (for example, indium gallium zinc oxide (IGZO) thin-film transistors), or organic thin-film transistors, etc., and in the embodiments of the present disclosure, thin-film transistors are taken as examples for explanation. The source electrode and the drain electrode of a transistor may be symmetrical in structure, so the source electrode and the drain electrode can be indistinguishable in structure. In the embodiment of the present disclosure, in order to distinguish the two electrodes of the transistor except the gate electrode, one electrode is directly described as the first electrode and the other electrode is the second electrode. In the embodiment of the present disclosure, the first electrode and the second electrode of all or part of the transistor can be interchangeable as required.

For example, according to the characteristics of transistors, transistors may be divided into N-type transistors and P-type transistors. For the sake of clarity, the embodiment of the present disclosure elaborates the technical scheme of the present disclosure by taking the transistor as an N-type transistor (for example, an N-type MOS transistor) as an example. In this case, the first electrode of the transistor is the drain electrode and the second electrode of the transistor is the source electrode. However, it should be noted that the transistors of the embodiments of the present disclosure are not limited to N-type transistors. For example, according to the actual needs, one or more transistors in the pixel circuit provided by the embodiments of the present disclosure may also adopt P-type transistors, in this case, the first electrode of the transistor is the source electrode and the second electrode of the transistor is the drain electrode, and as long as respective electrodes of a selected-type transistor are correspondingly connected in accordance with respective electrodes of a corresponding transistor in the embodiment of the present disclosure. In a case where an N-type transistor is used, Indium Gallium Zinc Oxide (IGZO) can be used as an active layer of the thin film transistor, which may effectively reduce the size of the transistor and prevent leakage current compared with using low temperature polysilicon (LTPS) or amorphous silicon (such as hydrogenated amorphous silicon) as the active layer of the thin film transistor. Of course, low-temperature polysilicon or amorphous silicon may also be used as the active layer of the thin film transistor.

It should be noted that in the embodiments of the present disclosure, reference numerals SG1, SG2, CG1, CG2, RG1, RG2, EM1, EM2, Vinit1, Vinit2, Vinit3, Vdata, Vdd, and Vss represent both signal lines or terminals and signals on the signal lines.

It is worth noting that the pixel circuit 200 may also have other structures according to the actual application requirements. In addition, the specific structure and implementation manner of each circuit in the pixel circuit 200 may be set according to the actual application requirements, and the embodiment of the present disclosure does not specifically limit this.

At least one embodiment of the present disclosure also provides a driving method, for example, the driving method may be used to drive the pixel circuit described in any of the above embodiments, for example, the pixel circuit shown in FIG. 2A and FIG. 2B.

Figure 4:
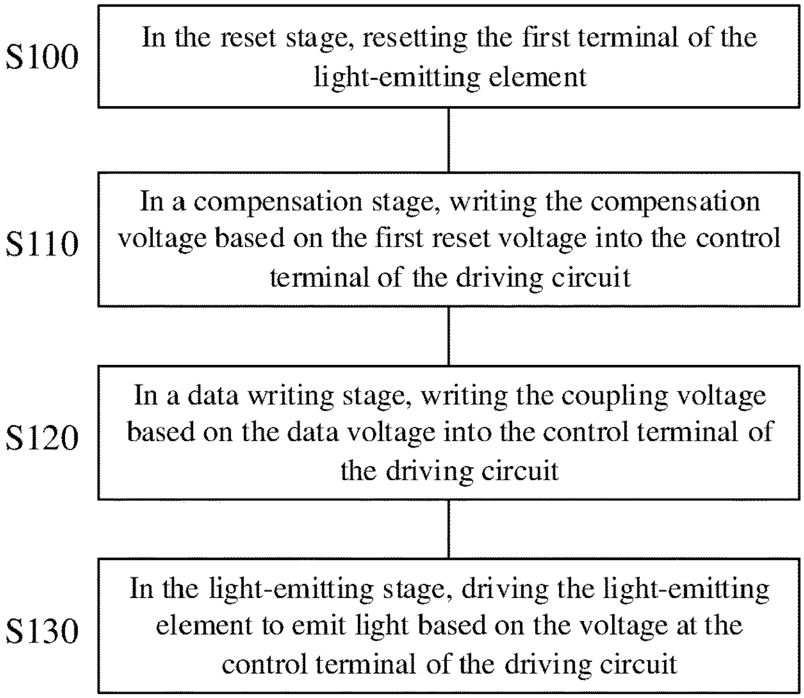
FIG. 4 is a schematic flowchart of a driving method of a pixel circuit provided by at least one embodiment of the present disclosure.

FIG. 4 is a schematic flowchart of a driving method of a pixel circuit provided by at least one embodiment of the present disclosure.

For example, as shown in FIG. 4, in some embodiments, the driving method includes the following steps S110~S130.

In step S110, in a compensation stage, writing the compensation voltage based on the first reset voltage into the control terminal of the driving circuit.

In step S120, in a data writing stage, writing the coupling voltage based on the data voltage into the control terminal of the driving circuit.

In step S130, in the light-emitting stage, driving the light-emitting element to emit light based on the voltage at the control terminal of the driving circuit.

For example, the data writing stage and the compensation stage are different, for example, in some examples, the data writing stage and the compensation stage do not overlap in time.

In the driving method provided by the embodiment of the present disclosure, in the data writing stage, the coupling voltage based on the data voltage is written into the control terminal of the driving circuit, so as to implement data writing, and in the compensation stage, the compensation voltage based on the first reset voltage is written into the control terminal of the driving circuit, so as to implement threshold compensation. By achieving data writing and threshold compensation separately, the time for threshold compensation can be prolonged, the purpose of full compensation can be achieved, the compensation effect can be improved, thus achieving that the time of threshold compensation has nothing to do with the refresh rate and resolution of the display panel, which ameliorates the display brightness uniformity of the display panel and improves the display effect.

For example, in some embodiments, the driving method further includes step S100. For example, as shown in FIG. 4, in step S100, in the reset stage, the first terminal of the light-emitting element is reset. For example, in the reset stage, the third reset voltage is written into the first terminal of the light-emitting element to reset the first terminal of the light-emitting element.

For example, in some embodiments, in the case that the data writing circuit includes a first data writing sub-circuit and a second data writing sub-circuit, the first data writing sub-circuit is connected to the data writing node, and the second data writing sub-circuit is connected to the data writing node and the control terminal of the driving circuit, the driving method may further include resetting the data writing node. For example, the process of resetting the data writing node needs to be performed before the data writing stage.

For example, in some embodiments, the first reset control signal RG1 and the first compensation control sub-signal CG1 may be the same. In this case, step S110 further includes writing a second reset voltage into the data writing node to reset the data writing node in the compensation stage. In other words, the process of resetting the data writing node is implemented in the compensation stage. In this case, in the data writing stage, the second reset control signal RG2 may be at an invalid level or a valid level.

For example, in other embodiments, the first reset control signal RG1 and the second reset control signal RG2 may be the same. In this case, step S100 further includes: writing a second reset voltage into the data writing node to reset the data writing node in the reset stage. In other words, the process of resetting the data writing node is implemented in the reset stage. In this situation, in the data writing stage, both the first reset control signal RG1 and the second reset control signal RG2 are at an invalid level.

It should be noted that in the embodiments of the present disclosure, when the signal is at a valid level, it means that the signal can control the corresponding transistor to be turned on, while when the signal is at an invalid level, it means that the signal can control the corresponding transistor to be turned off. For example, when the transistor is an N-type transistor, the valid level may be a high level and the invalid level may be a low level.

Figure 5A:
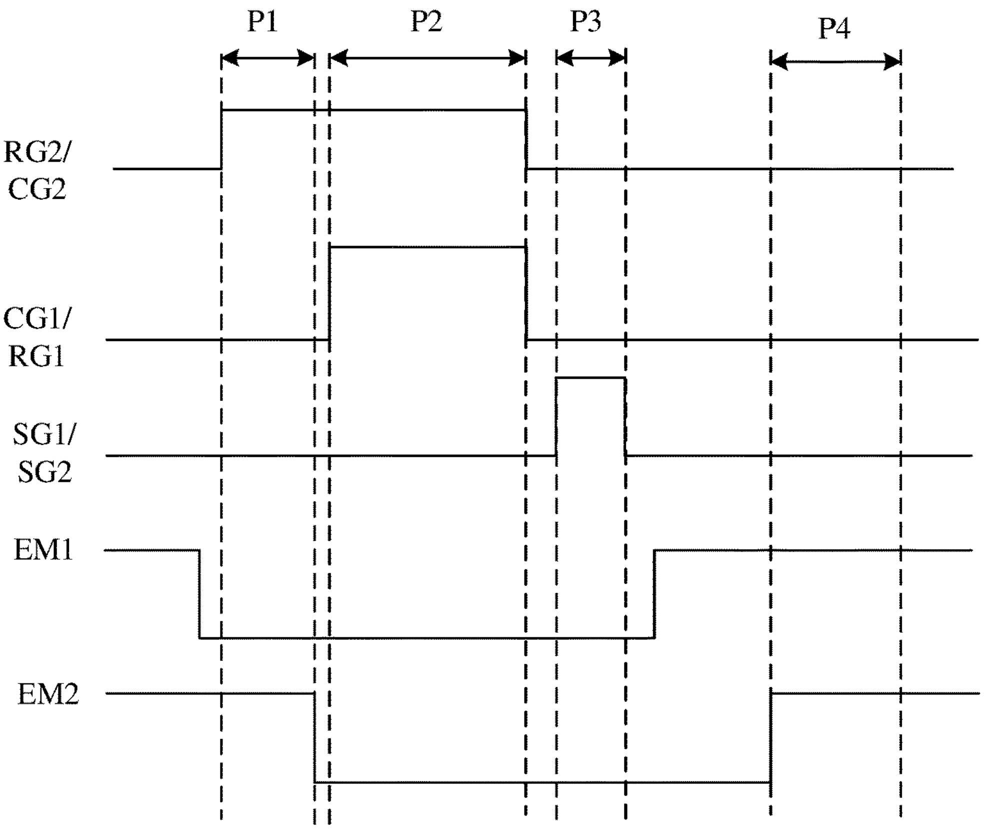
FIG. 5A is a circuit timing diagram of a pixel circuit provided by at least one embodiment of the present disclosure.

FIG. 5A is a circuit timing diagram of a pixel circuit provided by at least one embodiment of the present disclosure. The circuit timing diagram shown in FIG. 5A corresponds to the pixel circuit shown in FIG. 3A.

Next, the operation process of the pixel circuit shown in FIG. 3A will be described with reference to FIG. 5A. As shown in FIG. 5A, the present disclosure is described by taking a case that the first reset control signal RG1 and the first compensation control sub-signal CG1 are the same signal, the second reset control signal RG2 and the second compensation control sub-signal CG2 are the same signal, and the first scanning sub-signal SG1 and the second scanning sub-signal SG2 are the same signal as an example.

For example, the operation process of a pixel circuit in a display frame may include a reset stage P1, a compensation stage P2, a data writing stage P3, and a light-emitting stage P4.

For example, as shown in FIG. 5A, in the reset stage P1, the second reset control signal RG2, the second compensation control sub-signal CG2, and the second light-emitting control signal EM2 are at a high level, and the first reset control signal RG1, the first compensation control sub-signal CG1, the first light-emitting control signal EM1, the first scanning sub-signal SG1, and the second scanning sub-signal SG2 are at a low level, so that the second compensation transistor T5 is turned on under control of the high level of the second compensation control sub-signal CG2, and the second light-emitting control transistor T10 is turned on under control of the high level of the second light-emitting control signal EM2, in this way, the first voltage Vdd output by the first power supply line Vdd may be provided to the gate electrode and the second electrode (that is, the first node N1 and the second node N2) of the driving transistor T1 through the turned-on second light-emitting control transistor T10 and the turned-on second compensation transistor T5, so that the voltage of the gate electrode of the driving transistor T1 and the voltage of the second electrode of the driving transistor T1 are both the first voltage Vdd, thus achieving to reset the gate electrode and the second electrode of the driving transistor T1. At the same time, the second reset transistor T8 is turned on under control of the high level of the second reset control signal RG2, so that the third reset voltage Vinit3 output by the third reset voltage line Vinit3 may be provided to the first electrode (i.e., the fourth node N4) of the light-emitting element EL through the turned-on second reset transistor T8 to reset the first electrode of the light-emitting element EL. At this time, the first data writing transistor T2, the second data writing transistor T3, the first compensation transistor T4, the first reset transistor T6, and the first light-emitting control transistor T9 are all turned off.

It can be seen that, in the reset stage P1, the voltage of the first node N1 and the voltage of the second node N2 are both the first voltage Vdd, and the voltage of the fourth node N4 is the third reset voltage Vinit3.

For example, as shown in FIG. 5A, in the compensation stage P2, the first reset control signal RG1, the first compensation control sub-signal CG1, the second reset control signal RG2, and the second compensation control sub-signal CG2 are all at a high level, and the first light-emitting control signal EM1, the second light-emitting control signal EM2, the first scanning sub-signal SG1, and the second scanning sub-signal SG2 are all at a low level, so that the first compensation transistor T4 is turned on under control of the high level of the first compensation control sub-signal CG1 to supply the first reset voltage Vinit1 on the first reset voltage line Vinit1 to the second electrode of the driving transistor T1, that is, the third node N3, so that the voltage of the second electrode of the driving transistor T1 is the first reset voltage Vinit1. At this time, because the first voltage Vdd is written into the gate electrode of the driving transistor T1 in the reset stage P1, the driving transistor T1 is also turned on, in addition, the second compensation transistor T5 is also turned on under control of the high level of the second compensation control sub-signal CG2, so that the driving transistor T1 may be diode-connected. Therefore, the first reset voltage Vinit1 charges the gate electrode of the driving transistor T1 through the turned-on driving transistor T1 and the turned-on second compensation transistor T5 until the voltage of the gate electrode of the driving transistor T1 is Vinit1+Vth, the voltage Vinit1+Vth of the gate electrode of the driving transistor T1 is stored through the second capacitor C2, and Vth represents the threshold voltage of the driving transistor T1. The first reset transistor T6 is turned on under control of the high level of the first reset control signal RG1, so that the second reset voltage Vinit2 on the second reset voltage line Vinit2 is provided to the data writing node N5, so that the voltage of the data writing node N5 is reset to the second reset voltage Vinit2. At the same time, the second reset transistor T8 is turned on under control of the high level of the second reset control signal RG2, so that the third reset voltage Vinit3 output by the third reset voltage line Vinit3 may be provided to the first electrode (i.e., the fourth node N4) of the light-emitting element EL through the turned-on second reset transistor T8, so that the voltage of the first electrode (i.e., the fourth node N4) of the light-emitting element EL is maintained at the third reset voltage Vinit3. At this time, the first data writing transistor T2, the second data writing transistor T3, the first light-emitting control transistor T9, and the second light-emitting control transistor T10 are all turned off.

It can be seen that, in the compensation stage P2, the voltage of the first node N1 and the voltage of the second node N2 are both Vinit1+Vth, the voltage of the third node N3 is the first reset voltage Vinit1, the voltage of the fourth node N4 is the third reset voltage Vinit3, and the voltage of the data writing node N5 is the second reset voltage Vinit2.

For example, the compensation voltage is the voltage written into the first node N1 in the compensation stage, that is, Vinit1+Vth. When the second compensation transistor T5 is turned on, the compensation voltage may be written into the gate electrode of the driving transistor T1. The compensation voltage is obtained based on the first reset voltage Vinit1, and the threshold voltage of the driving transistor T1 is compensated based on the compensation voltage.

For example, in the compensation stage P2, by controlling the length of the time when the first compensation control sub-signal CG1 is at the high level and the length of the time when the second compensation control sub-signal CG2 is at the high level, the time length of the threshold compensation can be controlled. Because the compensation stage P2 only involves the threshold compensation and no data is written, the time length of the threshold compensation can be adjusted according to actual needs in the compensation stage P2, for example, the length of time when the first compensation control sub-signal CG1 is at a high level and the length of time when the second compensation control sub-signal CG2 is at a high level can be appropriately prolonged, thereby prolonging the length of time for the threshold compensation, making the process of the threshold compensation more flexible, improving the threshold compensation effect, and ameliorating the image quality influence brought by the process.

For example, as shown in FIG. 5A, in the data writing stage P3, the first scanning sub-signal SG1 and the second scanning sub-signal SG2 are at a high level, and the first reset control signal RG1, the first compensation control sub-signal CG1, the second reset control signal RG2, the second compensation control sub-signal CG2, the first light-emitting control signal EM1, and the second light-emitting control signal EM2 are at a low level. Therefore, the first data writing transistor T2 is turned on under control of the high level of the first scanning sub-signal SG1, and the second data writing transistor T3 is turned on under control of the high level of the second scanning sub-signal SG2, so that the data voltage Vdata on the data line Vdata is provided to the data writing node N5 through the turned-on first data writing transistor T2, so that the voltage of the data writing node N5 jumps from the second reset voltage Vinit2 to the data voltage Vdata, that is, the voltage variation of the data writing node N5 is Vdata-Vinit2. Then, due to the coupling voltage division of the first capacitor C1 and the second capacitor C2, the voltage variation of the first node N1 is (C11/(C11+C12))*(Vdata−Vinit2), where C11 is the capacitance value of the first capacitor C1 and C12 is the capacitance value of the second capacitor C2, so that the voltage of the first node N1 becomes Vinit1+Vth+(C11/(C11+C12))*(Vdata−Vinit2). At this time, the second light-emitting control transistor T10 is turned off under control of the low level of the second light-emitting control signal EM2, and the second compensation transistor T5 is turned off under control of the low level of the second compensation control sub-signal CG2, so that the second node N2 floats. At this time, the voltage at the second node N2 is maintained as Vinit1+Vth; the first compensation transistor T4 is turned off under control of the low level of the first compensation control sub-signal CG1, and the first light-emitting control transistor T9 is turned off under control of the low level of the first light-emitting control signal EM1, so that the third node N3 floats. At this time, the voltage of the third node N3 is maintained as the first reset voltage Vinit1; the second reset transistor T8 is turned off under control of the low level of the second reset control signal RG2, so that the fourth node N4 floats. At this time, the voltage of the fourth node N4 is maintained as the third reset voltage Vinit3.

It can be seen that, in the data writing stage P3, the voltage of the first node N1 is Vinit1+Vth+(C11/(C11+C12))*(Vdata−Vinit2), the voltage of the second node N2 is Vinit1+Vth, the voltage of the third node N3 is Vinit1, the voltage of the fourth node N4 is the third reset voltage Vinit3, and the voltage of the data writing node N5 is the data voltage Vdata.

For example, the coupling voltage is the voltage variation of the first node N1 in the data writing stage, that is, (C11/(C11+C12))*(Vdata−Vinit2), the coupling voltage is obtained based on the data voltage Vdata and the second reset voltage Vinit2. In addition, the coupling voltage is also related to the capacitance value C11 of the first capacitor C1 and the capacitance value C12 of the second capacitor C2.

For example, in the data writing stage P3, the voltage of the gate electrode of the driving transistor T1 is Vinit1+Vth+(C11/(C11+C12))*(Vdata−Vinit2), that is, the voltage of the gate electrode of the driving transistor T1 is the sum of the compensation voltage and the coupling voltage.

For example, in some embodiments, in the data writing stage P3, the second reset control signal RG2 and the second compensation control sub-signal CG2 may also be at a high level. At this time, the second reset transistor T8 is turned on under control of the high level of the second reset control signal RG2, so that the third reset voltage Vinit3 output by the third reset voltage line Vinit3 may be provided to the fourth node N4 through the turned-on second reset transistor T8, and the voltage of the fourth node N4 is maintained at the third reset voltage Vinit3. The second compensation transistor T5 is turned on under control of the high level of the second compensation control sub-signal CG2, so that the first node N1 and the second node N2 are connected, and the voltage of the second node N2 is the same as that of the first node N1, that is, the voltage of the second node N2 is also Vinit1+Vth+(C11/(C11+C12))*(Vdata−Vinit2). It should be noted that when the second reset control signal RG2 and the second compensation control sub-signal CG2 are not the same signal, in the data writing stage P3, the second reset control signal RG2 may be at a high level, while the second compensation control sub-signal CG2 may be at a low level, or at a high level, depending on actual requirements.

For example, as shown in FIG. 5A, in the light-emitting stage P4, the first light-emitting control signal EM1 and the second light-emitting control signal EM2 are at a high level, and the first reset control signal RG1, the first compensation control sub-signal CG1, the second reset control signal RG2, the second compensation control sub-signal CG2, the first scanning sub-signal SG1, and the second scanning sub-signal SG2 are at a low level. Therefore, the first light-emitting control transistor T9 is turned on under control of the high level of the first light-emitting control signal EM1. At this time, the voltage of the fourth node N4 jumps from the third reset voltage Vinit3 to Voled+Vss, where Voled represents the voltage between the first electrode and the second electrode of the light-emitting element EL in the light-emitting stage, so it can be known that the voltage variation of the fourth node N4 is (Voled+Vss)−Vinit3. The second data writing transistor T3 is turned off under control of the low level of the second scanning sub-signal SG1, the first node N1 is only subject to the coupling effect of the second capacitor C2, due to the coupling effect of the second capacitor C2, the voltage variation of the first node N1 is the same as that of the fourth node N4, that is, the voltage variation of the first node N1 is also (Voled+Vss)−Vinit3. Therefore, the voltage of the first node N1 changes from Vinit1+Vth+(C11/(C11+C12))*(Vdata−Vinit2) to Vinit1+Vth+(C11/(C11+C12))*(Vdata−Vinit2)+(Voled+Vss)−Vinit3. The second light-emitting control transistor T10 is turned on under control of the high level of the second light-emitting control signal EM2, so that the voltage of the third node N3 is the same as that of the fourth node N4, that is, the voltage of the third node N3 is Voled+Vss. For example, the second electrode of the driving transistor T1 is the source electrode, at this time, the voltage of the gate electrode of the driving transistor T1 is the voltage of the first node N1, the voltage of the source electrode of the driving transistor T1 is the voltage of the third node N3, so that the gate-source voltage (that is, the voltage difference between the voltage of the gate electrode of the driving transistor T1 and the voltage of the source electrode of the driving transistor T1) of the driving transistor T1 is:

$$\begin{aligned} Vgs &= Vinit1 + Vth + \left(C11/(C11+C12)\right) * (Vdata - Vinit2) + \\ &\quad (Voled + Vss) - Vinit3 - (Voled + Vss) \\ &= Vinit1 + Vth + \left(C11/(C11+C12)\right) * (Vdata - Vinit2) - Vinit3. \end{aligned}$$

For example, in some embodiments, the first reset voltage Vinit1 and the third reset voltage Vinit3 may be the same, so that Vgs=Vth+(C11/(C11+C12))*(Vdata−Vinit2). At this time, the driving transistor T1 is in a saturated state, so that the driving transistor T1 generates a driving current $I_{OLED}$:

$$I_{OLED} = (1/2) * K * (Vgs - Vth)^2 = (1/2) * K * ((C11/(C11 + C12)) * (Vdata - Vinit2))^2,$$

K is the structural constant related to process and design. As can be seen from the above formula, the driving current $I_{OLED}$ is no longer affected by the threshold voltage Vth of the driving transistor T1 and the first voltage Vdd of the first power supply line Vdd, but only related to the second reset voltage Vinit2 and the data voltage Vdata. The data voltage Vdata is directly transmitted by the data line, which is independent of the threshold voltage Vth of the driving transistor T1, thus solving the problem that the threshold voltage of the driving transistor T1 drifts due to the process and long-term operation. The second reset voltage Vinit2 is provided by the second reset voltage line, which is independent of the power supply voltage drop (IR drop) of the first power supply line Vdd, so that the problem of the IR drop of the display panel can be solved. To sum up, the pixel circuit can ensure the accuracy of the driving current $I_{OLED}$, eliminate the influence of the threshold voltage of the driving transistor T1 and IR drop on the driving current $I_{OLED}$, ensure the normal operation of the light-emitting element EL, improve the uniformity of the display screen, and enhance the display effect.

For example, K may be expressed as:

$$K = \mu_n C_{ox}(W/L)$$

where $\mu_n$ is the electron mobility of the driving transistor T1, $C_{ox}$ is the gate unit capacitance of the driving transistor T1, W is the channel width of the driving transistor T1, and L is the channel length of the driving transistor T1.

For example, according to the above formula of the driving current, the driving current is also related to the capacitance value C11 of the first capacitor C1 and the capacitance value C12 of the second capacitor C2, and the ratio of C11/C12 will affect the data range. Based on the pixel circuit shown in FIG. 3B, the influence of C11/C12 on the data range can be avoided.

Figure 5B:
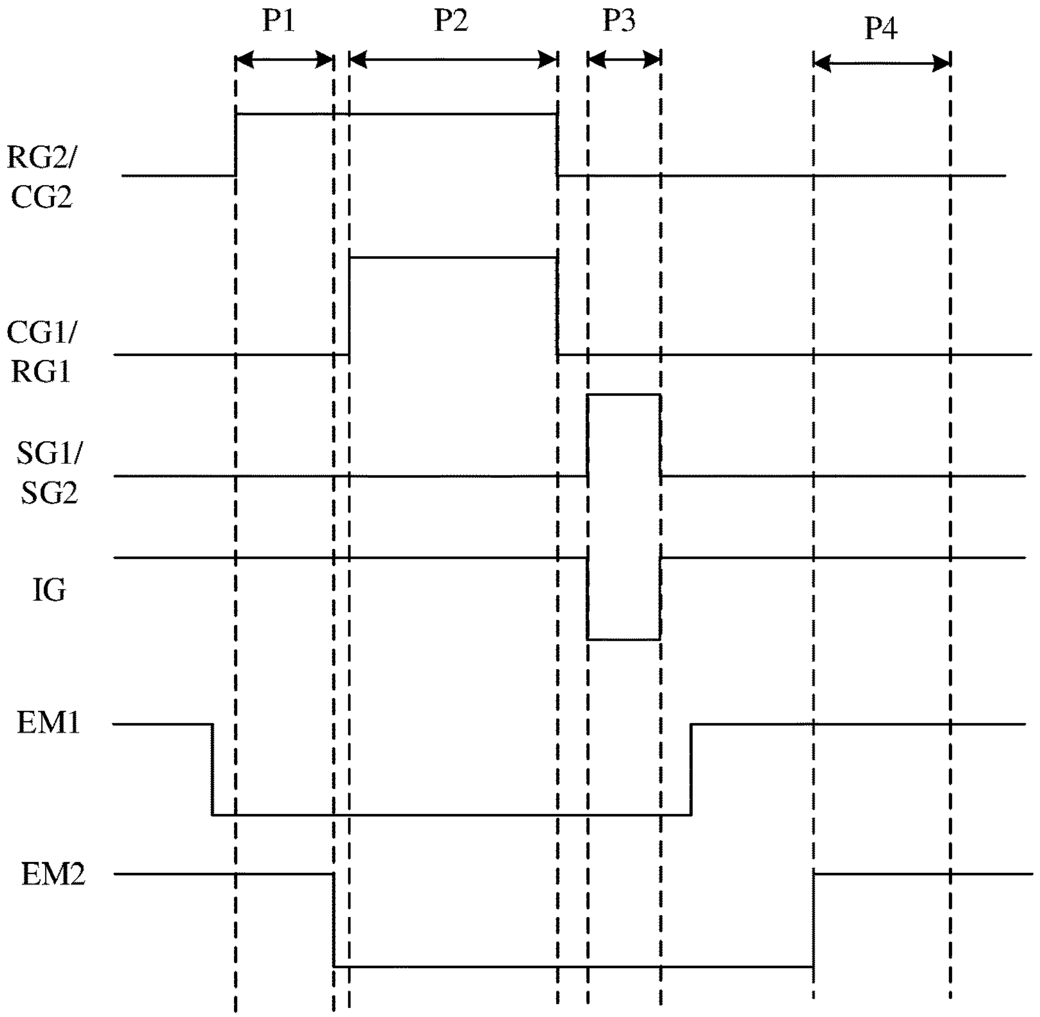
FIG. 5B is a circuit timing diagram of another pixel circuit provided by at least one embodiment of the present disclosure.

FIG. 5B is a circuit timing diagram of another pixel circuit provided by at least one embodiment of the present disclosure. The circuit timing diagram shown in FIG. 5B corresponds to the pixel circuit shown in FIG. 3B.

Next, the operation process of the pixel circuit shown in FIG. 3B will be described with reference to FIG. 5B. As shown in FIG. 5B, the present disclosure is described by taking a case that the first reset control signal RG1 and the first compensation control sub-signal CG1 are the same signal, the second reset control signal RG2 and the second compensation control sub-signal CG2 are the same signal, and the first scanning sub-signal SG1 and the second scanning sub-signal SG2 are the same signal as an example.

For example, the operation process of a pixel circuit in a display frame may include a reset stage P1, a compensation stage P2, a data writing stage P3, and a light-emitting stage P4.

It should be noted that, compared with the circuit timing diagram shown in FIG. 5A, the circuit timing diagram shown in FIG. 5B includes the isolation control signal IG, and the timing of other signals remains unchanged. Only the differences will be described below, and the same parts will not be repeated.

For example, as shown in FIG. 5B, in the reset stage P1, the isolation control signal IG is at a high level, the isolation transistor T7 is turned on, so that the second capacitor C2 is connected to the first node N1. At this time, the first voltage Vdd written into the first node N1 may be stored through the second capacitor C2. Based on the above description, it can be seen that in the reset stage P1, the voltage of the first node N1 and the voltage of the second node N2 are both the first voltage Vdd, and the voltage of the fourth node N4 is the third reset voltage Vinit3.

For example, as shown in FIG. 5B, in the compensation stage P2, the isolation control signal IG is at a high level, the isolation transistor T7 is turned on, so that the second capacitor C2 is connected to the first node N1. At this time, the voltage Vinit1+Vth written into the first node N1 may be stored through the second capacitor C2. Based on the above description, it can be seen that in the compensation stage P2, the voltage of the first node N1 and the voltage of the second node N2 are both Vinit1+Vth, the voltage of the third node N3 is the first reset voltage Vinit1, the voltage of the fourth node N4 is the third reset voltage Vinit3, and the voltage of the data writing node N5 is the second reset voltage Vinit2. For example, the compensation voltage is the voltage written into the first node N1 in the compensation stage, that is, Vinit1+Vth.

For example, as shown in FIG. 5B, in the data writing stage P3, the isolation control signal IG is at a low level, the isolation transistor T7 is turned off, thus turning off the connection between the second capacitor C2 and the first node N1. At this time, the first node N1 is only subjected to the coupling effect of the first capacitor C1, so that the voltage variation of the first node N1 is the same as that of the data writing node N5. The voltage variation of the data writing node N5 is Vdata−Vinit2, so the voltage variation of the first node N1 is also Vdata−Vinit2, and therefore, the voltage of the first node N1 becomes Vinit1+Vth+(Vdata-Vinit2). Based on the above description, in the data writing stage P3, the voltage of the second node N2 is Vinit1+Vth, the voltage of the third node N3 is the first reset voltage Vinit1, and the voltage of the fourth node N4 is the third reset voltage Vinit3. For example, the coupling voltage is the voltage variation of the first node N1 in the data writing stage, i.e., (Vdata−Vinit2), and the coupling voltage is obtained based on the data voltage Vdata and the second reset voltage Vinit2, and is independent of the capacitance value of the first capacitor C1 and the capacitance value of the second capacitor C2.

For example, as shown in FIG. 5B, in the light-emitting stage P4, the voltage of the fourth node N4 jumps from the third reset voltage Vinit3 to Voled+Vss, and Voled represents the voltage between the first electrode and the second electrode of the light-emitting element EL in the light-emitting stage, so it can be known that the voltage variation of the fourth node N4 is (Voled+Vss)−Vinit3. In the light-emitting stage P4, the isolation control signal IG is at a high level, the isolation transistor T7 is turned on, so that the second capacitor C2 is connected to the first node N1. At this time, based on the coupling effect of the second capacitor C2, the first node N1 changes with the change of the fourth node N4, and the voltage variation of the first node N1 is the same as that of the fourth node N4. That is, the voltage variation of the first node N1 is also (Voled+Vss)−Vinit3, so that the voltage of the first node N1 changes from Vinit1+Vth+(Vdata−Vinit2) to Vinit1+Vth+(Vdata−Vinit2)+(Voled+Vss)−Vinit3. At this time, the gate-source voltage (that is, the voltage difference between the voltage of the gate electrode of the driving transistor T1 and the voltage of the source electrode of the driving transistor T1) of the driving transistor T1 is:

$$Vgs = Vinit1 + Vth + (Vdata - Vinit2) + (Voled + Vss) - Vinit3 - (Voled + Vss) = Vinit1 + Vth + (Vdata - Vinit2) - Vinit3$$

For example, in some embodiments, the first reset voltage Vinit1 and the third reset voltage Vinit3 may be the same, so that Vgs=Vth+(Vdata−Vinit2). At this time, the driving transistor T1 is in a saturated state, so that the driving transistor T1 generates a driving current $I_{OLED}$:

$$I_{OLED} = (1/2) * K * (Vgs - Vth)^2 = (1/2) * K * (Vdata - Vinit2)^2$$

As can be seen from the above formula, the driving current $I_{OLED}$ has not been influenced by the capacitance value C11 of the first capacitor C1 and the capacitance value C12 of the second capacitor C2, thus avoiding the influence of the capacitance value C11 of the first capacitor C1 and the capacitance value C12 of the second capacitor C2 on the data range.

For example, as shown in FIG. 5A and FIG. 5B, the compensation stage P2 is before the data writing stage P3 in time, so that the reset of the data writing node N5 can be achieved in the reset stage P1 and/or the compensation stage P2; in time, the compensation stage P2 and the data writing stage P3 do not overlap with each other, so that the process of threshold compensation and the process of data writing are separated, and the limitation of the time of data writing on the time of threshold compensation is avoided, so that the compensation time of threshold compensation can be prolonged, the threshold compensation effect can be improved, the purpose of full compensation can be achieved, and the influence of technology on the image quality can be ameliorated.

It should be noted that the circuit timing diagrams shown in FIG. 5A and FIG. 5B provided by the embodiments of the present disclosure are only schematic, and the specific timing of the pixel circuit may be set according to the actual application scenario, which is not specifically limited by the present disclosure. For different types of transistors, the control signals of the gate electrodes of these transistors are different. For example, for an N-type transistor, when the control signal is a high-level signal, the N-type transistor is in a turn-on state; when the control signal is a low-level signal, the N-type transistor is in a turn-off state. For a P-type transistor, when the control signal is a low-level signal, the P-type transistor is in the turn-on state; however, when the control signal is a high-level signal, the P-type transistor is in the turn-off state. The control signal in the embodiments of the present disclosure may change according to the type of the transistor.

Figure 6:
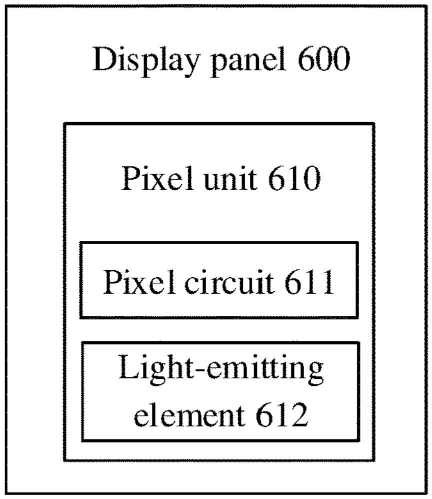
FIG. 6 is a schematic block diagram of a display panel provided by at least one embodiment of the present disclosure.

At least one embodiment of the present disclosure also provides a display panel. FIG. 6 is a schematic block diagram of a display panel provided by at least one embodiment of the present disclosure.

As shown in FIG. 6, the display panel 600 includes a plurality of pixel units 610, the plurality of pixel units 610 may be arranged in an array. Each pixel unit 610 may include a pixel circuit 611 and a light-emitting element 612. For example, the pixel circuit 611 may be the pixel circuit 200 described in any of the above embodiments, and the light-emitting element 612 may be the light-emitting element EL described in any of the above embodiments.

In the display panel, the time period for threshold compensation is separated from the time period for data writing through the data writing circuit and the compensation circuit in the pixel circuit, so as to improve the threshold compensation effect, achieve the purpose of full compensation, achieve that the compensation time is independent of the refresh rate and the resolution of the display panel, ameliorate the influence brought by the process on the image quality, ameliorate the display brightness uniformity of the display panel, and improve the display effect.

For example, the plurality of pixel units 610 may include a plurality of red pixel units, a plurality of blue pixel units, and a plurality of green pixel units.

For example, the display panel 800 may be a liquid crystal display panel, an organic light-emitting diode (OLED) display panel, or the like.

For example, the display panel 600 may be a rectangular panel, a circular panel, an oval panel, or a polygonal panel, etc. In addition, the display panel 600 can be not only a flat panel, but also a curved panel or even a spherical panel.

For example, the display panel 600 may also have a touch function, that is, the display panel 600 may be a touch display panel.

For example, the display panel 600 may be applied to mobile phones, tablet computers, televisions, monitors, notebook computers, digital photo frames, navigators, and other products or components with a display function.

For example, the display panel 600 may be a flexible display panel, so as to meet various practical application requirements, for example, the display panel 600 may be applied to a curved screen and the like.

It should be noted that the display panel 600 may also include other components, which are not limited by the embodiments of the present disclosure. For the sake of clarity and conciseness, the embodiments of the present disclosure do not give all the constituent units of the display panel 600. In order to achieve the basic functions of the display panel 600, a person skilled in the art can provide and set other structures not shown according to specific needs, and the embodiments of the present disclosure are not limited to this.

Figure 7:
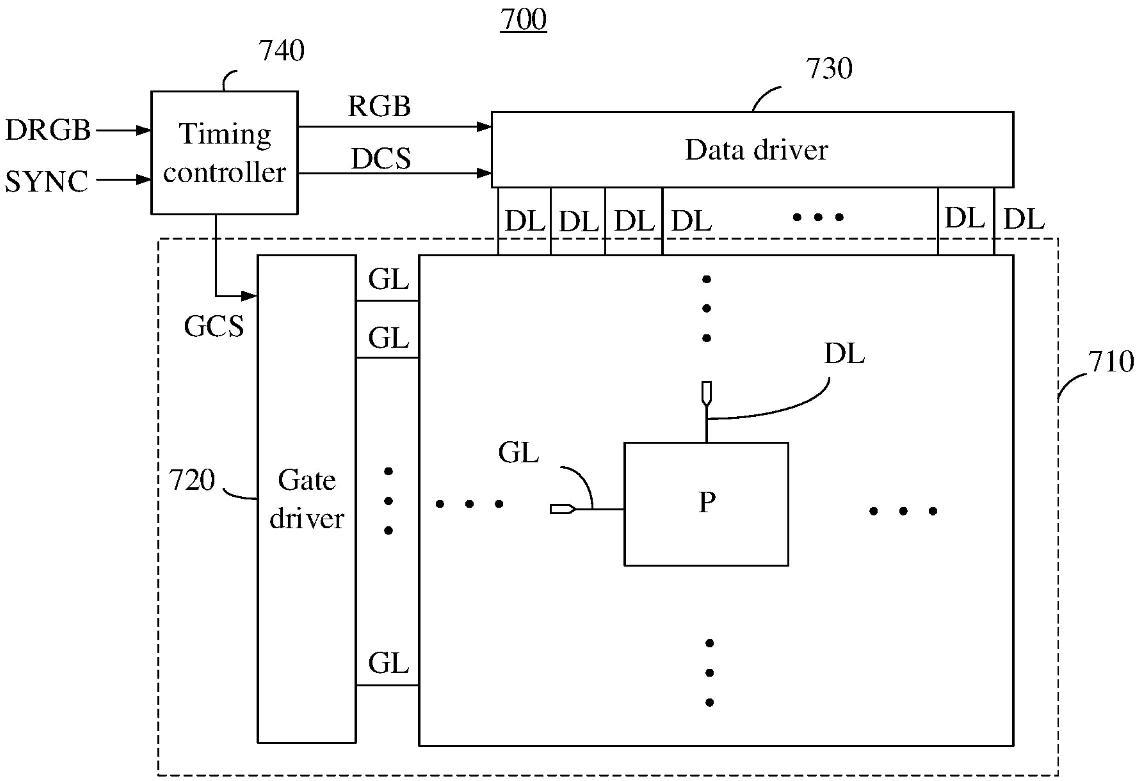
FIG. 7 is a schematic block diagram of a display device provided by at least one embodiment of the present disclosure.

At least one embodiment of the present disclosure also provides a display device. FIG. 7 is a schematic block diagram of a display device provided by at least one embodiment of the present disclosure.

As shown in FIG. 7, the display device 700 may include a display panel 710 for displaying images. The display panel 710 may be a display panel provided by any embodiment of the present disclosure, for example, the display panel 600 shown in FIG. 6.

For example, as shown in FIG. 7, the display device 700 may include a gate driver 720, the gate driver 720 is disposed on the display panel 710 and in a peripheral region of the display panel 710.

For example, as shown in FIG. 7, the display device 700 further includes a data driver 730 and a timing controller 740. For example, the data driver 730 and the timing controller 740 may also be arranged in the peripheral region of the display panel 710, however, the present disclosure is not limited to this, and the data driver 730 and the timing controller 740 may also be arranged outside the display panel 710 and are connected to the display panel 710 through a flexible printed circuit board.

For example, the display device 700 includes a plurality of gate lines GL, a plurality of data lines DL, and a plurality of pixel units P, the gate lines GL and the data lines DL cross to define the plurality of pixel units P, and the plurality of gate lines GL, the plurality of data lines DL, and the plurality of pixel units P are all arranged in a display region of the display panel 710. The gate driver 720 may be electrically connected with data writing circuits in pixel circuits of the pixel units through the plurality of gate lines GL (i.e., the first scanning signal line and the second scanning signal line) for providing scanning signals to the data writing circuits. The data driver 730 may be electrically connected with the data writing circuits in the pixel circuits of the pixel units through the plurality of data lines DL for providing data voltages to the data writing circuits.

For example, the timing controller 740 processes externally input digital image data DRGB to match the size and the resolution of the display device 700, and then provides the processed image data RGB to the data driver 730. The timing controller 740 generates a gate control signal GCS and a data control signal DCS using synchronization signals SYNC (such as a dot clock DCLK, a data enable signal DE, a horizontal synchronization signal Hsync, and a vertical synchronization signal Vsync) input from the outside of the display device 700. The timing controller 740 also provides the gate control signal GCS to the gate driver 720 and the data control signal DCS to the data driver 730 to control the gate driver 720 and the data driver 730.

For example, output terminals of a plurality of shift register units in the gate driver 720 are correspondingly connected to the plurality of gate lines GL. The plurality of gate lines GL are correspondingly connected with a plurality of rows of the pixel units. The output terminals of the plurality of shift register units in the gate driver 720 sequentially output a plurality of signals (for example, the scanning signals mentioned above) to the plurality of gate lines GL, so that the plurality of rows of pixel units in the display device 700 may be scanned line by line to achieve the progressive scanning.

For example, the data driver 730 uses a reference gamma voltage to convert the processed image data RGB input from the timing controller 740 into a data voltage according to a plurality of data control signals DCS from the timing controller 740. The data driver 730 provides the converted data voltages to the plurality of data lines DL.

For example, the gate driver 720 and the data driver 730 may be implemented by their respective application-specific integrated circuit chips (e.g., semiconductor chips), or may be directly manufactured on the display panel 710 through a semiconductor manufacture process. For example, the gate driver 720 may be integrated in the display device 700 to form a GOA (gate driver on array) circuit.

For example, as shown in FIG. 7, the gate control signal GCS provided by the timing controller 740 may be transmitted to the gate driver 720 through a trigger signal line NGSTV and is used as a trigger signal.

The technical effect of the display device 700 is the same as that of the display panel described in the embodiment of the present disclosure, and will not be repeated here.

For example, the display device 700 may be any product or component with a display function, such as a liquid crystal panel, an electronic paper, an OLED panel, a mobile phone, a tablet computer, a television, a displayer, a notebook computer, a digital photo frame, a navigator, etc., which is not limited by the embodiments of the present disclosure.

It should be noted that other components of the display device 700 (such as a voltage conversion circuit, an image data encoding/decoding circuit, a clock circuit, etc.) should be understood by those skilled in the art, and will not be repeated here, nor should they be used as limitations to the present disclosure.

For the present disclosure, the following statements should be noted:

(1) the accompanying drawings of the embodiment(s) of the present disclosure involve only the structure(s) in connection with the embodiment(s) of the present disclosure, and other structure(s) can refer to common design(s);

(2) for the purpose of clarity only, in the accompanying drawings for illustrating the embodiment(s) of the present disclosure, the thickness and size of a layer or a structure may be enlarged. However, it should be understood that, in the case in which a component or element such as a layer, film, region, substrate, or the like is referred to be "on" or "under" another component or element, it may be directly on or under the another component or element or a component or element is interposed therebetween; and (3) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A pixel circuit, comprising: a data writing circuit, a driving circuit, and a compensation circuit; wherein the driving circuit comprises a control terminal, a first terminal, and a second terminal, the compensation circuit is connected to the control terminal, the first terminal, and the second terminal of the driving circuit, and is configured to write a compensation voltage based on a first reset voltage into the control terminal of the driving circuit under control of a compensation control signal, the data writing circuit is connected to the control terminal of the driving circuit and is configured to write a coupling voltage based on a data voltage into the control terminal of the driving circuit under control of a scanning signal, and the driving circuit is configured to control a driving current for driving a light-emitting element to emit light under control of a voltage applied to the control terminal of the driving circuit, wherein the data writing circuit comprises a first data writing sub-circuit and a second data writing sub-circuit, and the scanning signal comprises a first scanning sub-signal and a second scanning sub-signal, the first data writing sub-circuit is connected to a data writing node and is configured to write the data voltage into the data writing node under control of the first scanning sub-signal, and the second data writing sub-circuit is connected to the data writing node and the control terminal of the driving circuit, and is configured to write the coupling voltage based on a voltage of the data writing node into the control terminal of the driving circuit under control of the second scanning sub-signal.

2. The pixel circuit according to claim 1, wherein the first data writing sub-circuit comprises a first data writing transistor, and the second data writing sub-circuit comprises a second data writing transistor and a first capacitor, a first electrode of the first data writing transistor is configured to receive the data voltage, a second electrode of the first data writing transistor is connected to the data writing node, and a gate electrode of the first data writing transistor is configured to receive the first scanning sub-signal, a first electrode of the first capacitor is connected to the data writing node, and a second electrode of the first capacitor is connected to a first electrode of the second data writing transistor, and a second electrode of the second data writing transistor is connected to the control terminal of the driving circuit, and a gate electrode of the second data writing transistor is configured to receive the second scanning sub-signal.

3. The pixel circuit according to claim 1, further comprising a first reset circuit, wherein the first reset circuit is connected to the data writing node and is configured to write a second reset voltage to the data writing node to reset the data writing node under control of a first reset control signal, and wherein the first reset circuit comprises a first reset transistor, a first electrode of the first reset transistor is configured to receive the second reset voltage, a second electrode of the first reset transistor is connected to the data writing node, and a gate electrode of the first reset transistor is configured to receive the first reset control signal.

4. The pixel circuit according to claim 1, wherein the compensation circuit comprises a first compensation sub-circuit and a second compensation sub-circuit, and the compensation control signal comprises a first compensation control sub-signal and a second compensation control sub-signal, the first compensation sub-circuit is connected to the second terminal of the driving circuit and is configured to write the first reset voltage into the second terminal of the driving circuit under control of the first compensation control sub-signal, and the second compensation sub-circuit is connected to the first terminal of the driving circuit and the control terminal of the driving circuit, and is configured to write the compensation voltage into the control terminal of the driving circuit under control of the second compensation control sub-signal, wherein the first compensation sub-circuit comprises a first compensation transistor and the second compensation sub-circuit comprises a second compensation transistor, a first electrode of the first compensation transistor is configured to receive the first reset voltage, a second electrode of the first compensation transistor is connected to the second terminal of the driving circuit, and a gate electrode of the first compensation transistor is configured to receive the first compensation control sub-signal, and a first electrode of the second compensation transistor is connected to the first terminal of the driving circuit, a second electrode of the second compensation transistor is connected to the control terminal of the driving circuit, and a gate electrode of the second compensation transistor is configured to receive the second compensation control sub-signal.

5. The pixel circuit according to claim 2, further comprising a storage circuit, wherein the storage circuit is connected to the control terminal of the driving circuit and a first terminal of the light-emitting element, and is configured to store a voltage of the control terminal of the driving circuit, and wherein the storage circuit comprises a second capacitor, a first electrode of the second capacitor is connected to the control terminal of the driving circuit, and a second electrode of the second capacitor is connected to the first terminal of the light-emitting element.

6. The pixel circuit according to claim 5, further comprising an isolation circuit, wherein the isolation circuit is connected between the control terminal of the driving circuit and the storage circuit, and is configured to disconnect a connection between the control terminal of the driving circuit and the storage circuit under control of an isolation control signal in a case where the data writing circuit writes the coupling voltage based on the data voltage into the control terminal of the driving circuit.

7. The pixel circuit according to claim 6, wherein the isolation circuit comprises an isolation transistor, a first electrode of the isolation transistor is connected to the control terminal of the driving circuit, a second electrode of the isolation transistor is connected to the storage circuit, and a gate electrode of the isolation transistor is configured to receive the isolation control signal.

8. The pixel circuit according to claim 6, wherein a phase of the isolation control signal is opposite to a phase of the second scanning sub-signal.

9. The pixel circuit according to claim 6, further comprising a second reset circuit, wherein the second reset circuit is connected to a first terminal of the light-emitting element and is configured to write a third reset voltage to the first terminal of the light-emitting element under control of a second reset control signal to reset the first terminal of the light-emitting element, and wherein the second reset circuit comprises a second reset transistor, a first electrode of the second reset transistor is connected to the first terminal of the light-emitting element, a second electrode of the second reset transistor is configured to receive the third reset voltage, and a gate electrode of the second reset transistor is configured to receive the second reset control signal.

10. The pixel circuit according to claim 9, wherein the first reset voltage and the third reset voltage are identical.

11. The pixel circuit according to claim 1, further comprising a first light-emitting control circuit, wherein the first light-emitting control circuit is connected to a first terminal of the light-emitting element and the second terminal of the driving circuit, and is configured to control a connection between the first terminal of the light-emitting element and the second terminal of the driving circuit to be disconnected or connected under control of a first light-emitting control signal, and wherein the first light-emitting control circuit comprises a first light-emitting control transistor, a gate electrode of the first light-emitting control transistor is configured to receive the first light-emitting control signal, a first electrode of the first light-emitting control transistor is connected to the second terminal of the driving circuit, and a second electrode of the first light-emitting control transistor is connected to the first terminal of the light-emitting element.

12. The pixel circuit according to claim 1, further comprising a second light-emitting control circuit, wherein the second light-emitting control circuit is connected to a first power supply line and the first terminal of the driving circuit, and is configured to control a connection between the first terminal of the driving circuit and the first power supply line to be disconnected or connected under control of a second light-emitting control signal, and wherein the second light-emitting control circuit comprises a second light-emitting control transistor, a gate electrode of the second light-emitting control transistor is configured to receive the second light-emitting control signal, a first electrode of the second light-emitting control transistor is connected to the first power supply line, and a second electrode of the second light-emitting control transistor is connected to the first terminal of the driving circuit.

13. A pixel circuit comprising: a data writing circuit, a driving circuit, a compensation circuit, a storage circuit, a first reset circuit, a second reset circuit, a first light-emitting control circuit, and a second light-emitting control circuit; wherein the driving circuit comprises a driving transistor, the data writing circuit comprises a first data writing sub-circuit and a second data writing sub-circuit, the first data writing sub-circuit comprises a first data writing transistor, and the second data writing sub-circuit comprises a second data writing transistor and a first capacitor, a first electrode of the first data writing transistor is configured to receive a data voltage, a second electrode of the first data writing transistor is connected to a data writing node, a gate electrode of the first data writing transistor is configured to receive a first scanning sub-signal, a first electrode of the first capacitor is connected to the data writing node, a second electrode of the first capacitor is connected to a first electrode of the second data writing transistor, a second electrode of the second data writing transistor is connected to a gate electrode of the driving transistor, and a gate electrode of the second data writing transistor is configured to receive a second scanning sub-signal;

the compensation circuit comprises a first compensation sub-circuit and a second compensation sub-circuit, the first compensation sub-circuit comprises a first compensation transistor, and the second compensation sub-circuit comprises a second compensation transistor, a first electrode of the first compensation transistor is configured to receive a first reset voltage, a second electrode of the first compensation transistor is connected to a second electrode of the driving transistor, and a gate electrode of the first compensation transistor is configured to receive a first compensation control sub-signal; a first electrode of the second compensation transistor is connected to a first electrode of the driving transistor, a second electrode of the second compensation transistor is connected to the gate electrode of the driving transistor, and a gate electrode of the second compensation transistor is configured to receive a second compensation control sub-signal;

the first reset circuit comprises a first reset transistor, a first electrode of the first reset transistor is configured to receive a second reset voltage, a second electrode of the first reset transistor is connected to the data writing node, and a gate electrode of the first reset transistor is configured to receive a first reset control signal, the storage circuit comprises a second capacitor, a first electrode of the second capacitor is connected to the gate electrode of the driving transistor, and a second electrode of the second capacitor is connected to a first terminal of a light-emitting element, the second reset circuit comprises a second reset transistor, a first electrode of the second reset transistor is connected to the first terminal of the light-emitting element, a second electrode of the second reset transistor is configured to receive a third reset voltage, and a gate electrode of the second reset transistor is configured to receive a second reset control signal;

the first light-emitting control circuit comprises a first light-emitting control transistor, a gate electrode of the first light-emitting control transistor is configured to receive a first light-emitting control signal, a first electrode of the first light-emitting control transistor is connected to the second electrode of the driving transistor, and a second electrode of the first light-emitting control transistor is connected to the first terminal of the light-emitting element; and the second light-emitting control circuit comprises a second light-emitting control transistor, a gate electrode of the second light-emitting control transistor is configured to receive a second light-emitting control signal, a first electrode of the second light-emitting control transistor is connected to a first power supply line, and a second electrode of the second light-emitting control transistor is connected to the first electrode of the driving transistor.

14. The pixel circuit according to claim 13, further comprising an isolation circuit, wherein the isolation circuit comprises an isolation transistor, the second capacitor is connected to the gate electrode of the driving transistor through the isolation transistor, a first electrode of the isolation transistor is connected to the gate electrode of the driving transistor, a second electrode of the isolation transistor is connected to the first electrode of the second capacitor, and a gate electrode of the isolation transistor is configured to receive an isolation control signal.

15. A driving method applied to a pixel circuit, wherein the pixel circuit comprises a data writing circuit, a driving circuit, and a compensation circuit, the driving circuit comprises a control terminal, a first terminal, and a second terminal, the compensation circuit is connected to the control terminal, the first terminal, and the second terminal of the driving circuit, and is configured to write a compensation voltage based on a first reset voltage into the control terminal of the driving circuit under control of a compensation control signal, the data writing circuit is connected to the control terminal of the driving circuit and is configured to write a coupling voltage based on a data voltage into the control terminal of the driving circuit under control of a scanning signal, and the driving circuit is configured to control a driving current for driving a light-emitting element to emit light under control of a voltage applied to the control terminal of the driving circuit, wherein the data writing circuit comprises a first data writing sub-circuit and a second data writing sub-circuit, and the scanning signal comprises a first scanning sub-signal and a second scanning sub-signal, the first data writing sub-circuit is connected to a data writing node and is configured to write the data voltage into the data writing node under control of the first scanning sub-signal, and the second data writing sub-circuit is connected to the data writing node and the control terminal of the driving circuit, and is configured to write the coupling voltage based on a voltage of the data writing node into the control terminal of the driving circuit under control of the second scanning sub-signal, the driving method comprises:

in a compensation stage, writing the compensation voltage based on the first reset voltage into the control terminal of the driving circuit;

in a data writing stage, writing the coupling voltage based on the data voltage into the control terminal of the driving circuit; and in a light-emitting stage, driving the light-emitting element to emit light based on the voltage applied to the control terminal of the driving circuit.

16. The driving method according to claim 15, further comprising:

in the compensation stage, writing a second reset voltage into the data writing node to reset the data writing node.

17. The driving method according to claim 15, further comprising:

in a reset stage, resetting a first terminal of the light-emitting element.

18. A display panel comprising the pixel circuit according to claim 2.

19. A display device comprising the display panel according to claim 18.

* * * * *